United States Patent
Matsuzaki et al.

(10) Patent No.: US 7,489,361 B2
(45) Date of Patent: Feb. 10, 2009

(54) PIXEL INTERPOLATON APPARATUS AND METHOD WITH DISCRIMINATION OF SIMILARITY BETWEEN A DISCRIMINATION BLOCK AND A PLURALITY OF REFERENCE BLOCKS

(75) Inventors: Eiichi Matsuzaki, Chofu (JP); Kenji Inoue, Hiratsuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 609 days.

(21) Appl. No.: 11/079,441

(22) Filed: Mar. 15, 2005

(65) Prior Publication Data
US 2005/0212961 A1 Sep. 29, 2005

(30) Foreign Application Priority Data
Mar. 16, 2004 (JP) .............................. 2004-075204
Mar. 9, 2005 (JP) .............................. 2005-065479

(51) Int. Cl.
H04N 7/01 (2006.01)
H04N 11/20 (2006.01)
G09G 5/00 (2006.01)
G06K 9/32 (2006.01)

(52) U.S. Cl. ...................... 348/458; 348/448; 382/300; 382/269; 345/671

(58) Field of Classification Search ................ 348/448, 348/452, 441, 458, 701; 382/298–300, 269; 345/667–671
See application file for complete search history.

(56) References Cited

U.S. PATENT DOCUMENTS

| | | | | |
|---|---|---|---|---|
| 5,019,903 A | * | 5/1991 | Dougall et al. ............... | 348/448 |
| 5,532,751 A | * | 7/1996 | Lui ............................ | 348/452 |
| 5,796,437 A | * | 8/1998 | Muraji et al. ............... | 348/452 |
| 5,936,676 A | * | 8/1999 | Ledinh et al. ............... | 348/452 |
| 6,118,488 A | * | 9/2000 | Huang ........................ | 348/452 |
| 6,421,090 B1 | * | 7/2002 | Jiang et al. .................. | 348/452 |
| 6,614,484 B1 | * | 9/2003 | Lim et al. ................... | 348/448 |
| 6,731,342 B2 | | 5/2004 | Shin et al. ................... | 348/452 |
| 6,795,123 B2 | | 9/2004 | Gotanda et al. ............. | 348/448 |
| 7,023,487 B1 | * | 4/2006 | Adams ........................ | 348/448 |
| 7,092,032 B1 | * | 8/2006 | Matsunaga et al. .......... | 348/452 |
| 7,126,643 B2 | * | 10/2006 | Song et al. .................. | 348/448 |
| 7,154,556 B1 | * | 12/2006 | Wang et al. ................. | 348/452 |

(Continued)

FOREIGN PATENT DOCUMENTS

CN 1 433 632 A 7/2003

(Continued)

OTHER PUBLICATIONS

Oct. 31, 2006 European Search Report in EP 05 00 5583.

*Primary Examiner*—Victor R Kostak
(74) *Attorney, Agent, or Firm*—Fitzpatrick, Cella, Harper & Scinto

(57) ABSTRACT

The invention provides a pixel interpolating method including a step of discriminating, based on an input image signal, a similarity of a discrimination block constituted of plural pixels, and a reference block constituted of plural pixels, positioned close to the discrimination block and shifted upwards or downwards to a position by at least a line with respect to the discrimination block, and a step of outputting, as pixel information of an interpolation pixel positioned between a discrimination block and a reference block having a high similarity, pixel information based on pixel information of a pixel of the discrimination block and/or the reference block having the high similarity.

12 Claims, 35 Drawing Sheets

U.S. PATENT DOCUMENTS

| | | | |
|---|---|---|---|
| 7,218,354 B2 * | 5/2007 | Tanaka | 348/448 |
| 7,242,819 B2 * | 7/2007 | Jiang | 382/300 |
| 7,245,326 B2 * | 7/2007 | Orlick | 348/448 |
| 2002/0080269 A1 | 6/2002 | Gotanda et al. | 348/448 |
| 2002/0093587 A1 | 7/2002 | Michel | 348/452 |
| 2003/0172381 A1 * | 9/2003 | Janevski | 725/46 |
| 2003/0189674 A1 | 10/2003 | Inoue et al. | 348/738 |
| 2004/0046773 A1 | 3/2004 | Inoue et al. | 345/698 |
| 2004/0113929 A1 | 6/2004 | Matsuzaki | 345/700 |
| 2004/0158874 A1 | 8/2004 | Ono et al. | 725/131 |
| 2004/0246375 A1 | 12/2004 | Matsuzaki et al. | 348/452 |
| 2004/0263684 A1 | 12/2004 | Tanaka | 348/448 |

FOREIGN PATENT DOCUMENTS

| | | |
|---|---|---|
| EP | 1 271 948 A1 | 1/2003 |
| EP | 1 313 312 A1 | 5/2003 |
| JP | 6-153169 | 5/1994 |
| JP | 2990737 B2 | 10/1999 |
| JP | 2996099 B2 | 10/1999 |
| JP | 2000-115720 | 4/2000 |
| JP | 2001-218169 | 8/2001 |
| JP | 2001-218170 | 8/2001 |
| JP | 2002-252834 | 9/2002 |
| WO | WO 01/56282 A1 | 8/2001 |
| WO | WO 2004/017634 A1 | 2/2004 |

\* cited by examiner

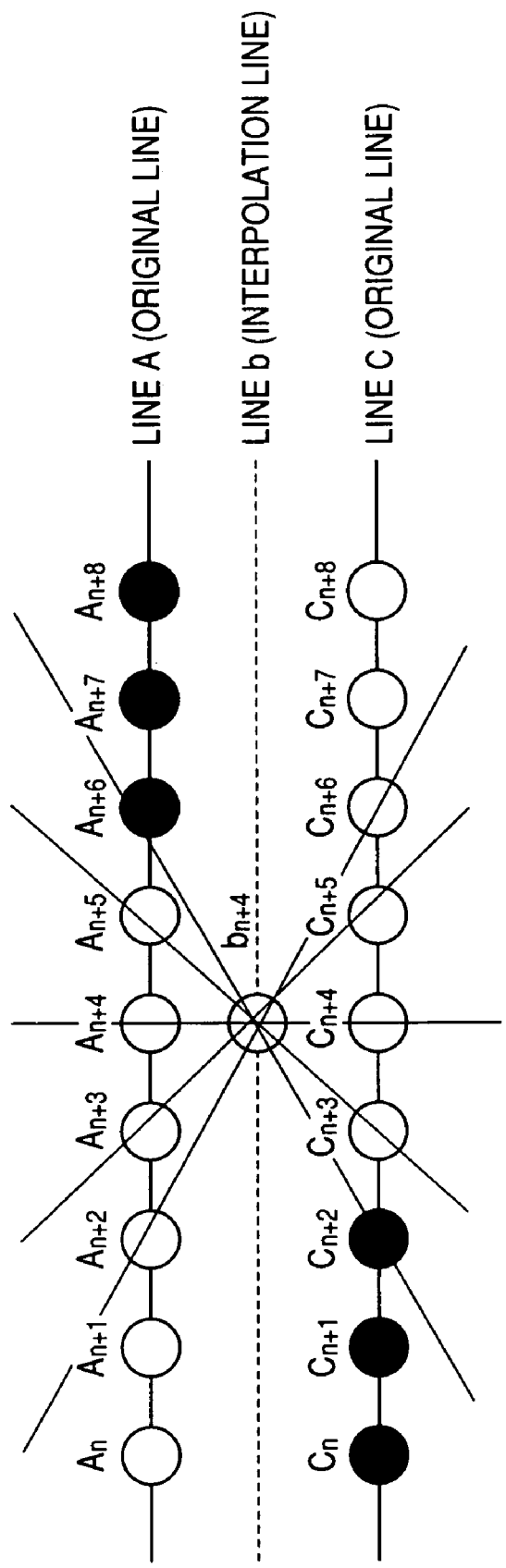

PIXEL INTERPOLATON APPARATUS AND METHOD WITH DISCRIMINATION OF SIMILARITY BETWEEN A DISCRIMINATION BLOCK AND A PLURALITY OF REFERENCE BLOCKS

BACKGROUND OF THE INVENTION

1. Field of the Invention

The present invention relates to a pixel interpolating apparatus and a pixel interpolating method, and more particularly to a pixel interpolating apparatus and a pixel interpolating method for converging image information by an interlaced scanning in television into image information for a progressive scanning, or for a resolution conversion of image information processed by a computer.

2. Related Background Art

In the television broadcasting system, a change from a conventional analog system to a digital system is being recently investigated, and, triggered by a new technical innovation by digitization, the television broadcasting is going to further advance as information communication media and to achieve a drastic development. Digitization is already realized in a broadcasting utilizing a communication satellite (CS) or a broadcasting satellite (BS). Also digitization is investigated also for the ground wave broadcasting, and all the broadcasting waves will shift to the digital system in a near future.

An advantage of the digital television broadcasting is that plural channels are made possible, as the digital system can transmit programs of three channels within a frequency band corresponding to one channel in the analog system. This advantage can realize a new service such as a multi program (mixed multiplex program) in which a news, a sports program, a drama etc. are combined, or a multi-channel broadcasting for broadcasting three different program within a single channel.

Also the digital television broadcasting is not limited to a broadcasting of an image and an audio signal, but enables an integral broadcasting service in which various data broadcastings are added. The service including data broadcasting is classified into a multimedia-like service in which data information is added to a television program, and a service provided independently from a television program, and principal ones of such service include an observer-involving television program, a home shopping, various information services, and a weather forecast and a news that can be viewed at any time.

For matching with such digital television broadcasting, also the television receiving apparatus is showing progresses, including a thin large-sized plasma display and a cathode ray tube of a high resolution matching the digital television broadcasting. Such display apparatuses executes an image display not by a conventional interlaced scanning but by a progressive scanning. Therefore, a conventional analog television broadcasting is displayed by converting image information for interlaced scanning into image information for progressive scanning (hereinafter called IP (interlace-progressive) conversion) and also converting the image information to a resolution of the display apparatus.

(Configuration of Prior IP Conversion Process Circuit)

Now, there will be briefly explained a prior IP conversion process circuit.

FIG. 27 is a block diagram showing the structure of an ordinary IP conversion process circuit.

Field information memories 101, 102 store input image information in the unit of a field. A movement information generator 103 discriminates moving image information or still image information for each pixel by observing a difference between current input field information and field information which is inputted earlier than the current input field information by a frame period and which is outputted from a field information memory (2) 102, and judges and outputs a movement in an interpolating pixel from thus determined movement information for each pixel. A line information memory 104 stores the input image information in the unit of a line. An adder 107 executes an addition of input signals of two systems. A divider 108 determines a value of a half of the added value obtained by the adder 107. An interpolation information selector 109 selects as an interpolation pixel value, according to an output signal from the movement information generator 103, either pixel information inputted earlier by a field period than the current input field information or an average value of the pixel values of upper and lower lines of an interpolation pixel position, outputted from the divider 108. Input/output speed converters 105, 106 respectively store the pixel information outputted from the interpolation information selector 109 and the input pixel information, in the unit of a line, and execute readouts of the stored pixel information at a twice speed of the input image information. A display information selector 110 outputs the pixel information from the input/output speed converter (1) 105 and that from the input/output speed converter (2) 106 alternately for every line.

(Function of Prior IP Conversion Process Circuit)

In the following, there will be explained functions of the prior IP conversion process circuit described above.

Input image information for interlaced scanning is supplied to the field information memory (1) 101 and the line information memory 104, from which pixel information delayed by a field period and pixel information of a preceding line can be respectively obtained. FIG. 28 shows a mode of image information display in an NTSC (national television system committee) displayed by an interlaced scanning. In the NTSC signal, an image is constituted of 525 horizontal lines and is called a frame. Such frame is divided, by an interlaced scanning, into an odd field representing odd-numbered lines as shown in (b) and an even field representing even-numbered lines as shown in (c), and the NTSC signal displays image information of 525 lines by alternately displaying an image of the odd field and an image of the even field. Thus the odd field and the even field mutually interpolate the information of deficient lines. Therefore, referring to FIG. 27 again, pixel information of a preceding field corresponding to the position of the pixel to be interpolated is obtained from the field information memory (1) 101, and pixel information in upper and lower lines of the pixel to be interpolated is obtained from the input image information and the line information memory 104. Also averages of pixel information in the upper and lower lines of the pixel to be interpolated are obtained by the adder 107 and the divider 108 from the input image information and the line information memory 104, and are used as interpolation pixel information in a moving image.

The pixel information outputted from the field information memory (1) 101 is further delayed by a field period by the field information memory (2) 102, thereby providing image information delayed by a frame period from the input image information, namely pixel information of a preceding frame corresponding to the input pixel position.

In the following there will be given an explanation on the movement information generator 103.

FIG. 29 is a block diagram of an embodiment of the movement information generator 103.

Referring to FIG. 29, a subtractor 1031 determines a difference between the currently inputted field information and field inputted earlier by a frame period than the currently inputted field information and outputted from the field information memory (2) 102. An absolute value device 1032 determines an absolute value of the difference obtained by the subtractor 1031. A threshold filter circuit 1033 compares the value determined by the absolute value device 1032 and a predetermined threshold value, and, in case the value determined by the absolute value device 1032 is smaller than the threshold value, judges the pixel as a still image and outputs a value "0", but, in case the value determined by the absolute value device 1032 is equal to or larger than the threshold value, judges the pixel as a moving image and outputs a value "1", whereby, even in case the input image information includes inappropriate pixel information such as a noise, the influence of a certain fluctuation can be eliminated. A line movement memory 1034 stores, in the unit of a line, movement information of each pixel outputted from the threshold filter circuit 1033, whereby movement information earlier by a line than the input image information can be obtained. An interpolation pixel movement information generator 1035 judges and outputs, from the movement information outputted from the threshold filter circuit 1033 and the movement information of a preceding line outputted from the line movement information memory 1034, movement information of an interpolation pixel generated between these lines.

Again referring to FIG. 27, the interpolation information selector 109 selects and outputs, as interpolation pixel information, pixel information outputted from the field information memory (1) 101 or the pixel information outputted from the divider 108 respectively in case the movement information outputted from the movement information generator 103 is "0" or "1".

The input/output speed converters (1) 105 and (2) 106 respectively store, in the unit of a line, the interpolation pixel information outputted from the interpolation information selector 109 and the input image information, then the stored pixel information is read out with a speed twice of the speed of the input image information, and the pixel information outputted from the input/output speed converter (1) 105 and the pixel information outputted from the input/output speed converter (2) 106 are outputted alternately for every line by the display information selector 110.

In the prior IP conversion method explained above, the pixel information of the generated interpolation pixel becomes different depending upon whether the input image information is a moving image or a still image. More specifically, in case of a still image, the pixel information inputted earlier by a field period, outputted from the field information memory (1) 101, is used as the pixel information for the interpolation pixel, thereby generating the pixel information faithful to the original image information. On the other hand, in case of a moving image, an average value of the pixels positioned in the upper and lower lines of the pixel to be interpolated, outputted from the divider 108, is used as the pixel information for the interpolation pixel, thereby resulting in various deteriorations in the image quality, in comparison with the original image information. Particularly the defects appear in case the original image information includes a slope in an oblique direction as shown in FIG. 30. FIG. 31 shows a state where the original image information shown in FIG. 30 is inputted by an interlaced scanning of every other lines and is subjected to an interpolation process for a moving image by the IP conversion process circuit shown in FIG. 27. As will be apparent from FIG. 31, in case of the interpolation process as a moving image by the IP conversion process circuit, the image information which originally has a smooth slope in the oblique direction as shown in FIG. 30 is interpolated as image information with stepwise changes, thus providing an image lacking smoothness.

FIG. 32 indicates, as another example having a slope in the oblique direction, image information of an oblique line with a line width corresponding to a pixel. FIG. 33 shows a result in case such image information is inputted by an interlaced scanning of every other lines and is subjected to an interpolation process as a moving image similarly by the IP conversion process circuit. Such image information including an oblique line with continuous pixel values is thus displayed as a broken line.

Against such problem, proposals are made, for example in Japanese Patent Application Laid-open No. H06-153169, Japanese Patent Application Laid-open No. 2000-115720, Japanese Patent Application Laid-open No. 2001-218169, Japanese Patent Application Laid-open No. 2001-218170, Japanese Patent Application Laid-open No. 2002-252834, Japanese Patent No. 2990737 and Japanese Patent No. 2996099 of referring to a combination of two pixels plural inclined directions with respect to a center pixel to be interpolated and determining the pixel information of the interpolation pixel from a combination with a small difference.

SUMMARY OF THE INVENTION

There is being desired a pixel interpolating technology such as IP conversion or resolution conversion, and an object of the present invention is to provide a novel and useful pixel interpolating technology.

According to the present invention, there is provided a pixel interpolating apparatus including:

a discrimination circuit for discriminating, based on an input image signal, a similarity of a discrimination block formed by plural pixels, and plural reference blocks each formed by plural pixels and positioned close to the discrimination block but shifted upwards or downwards by at least a line with respect to the discrimination block; and a circuit for outputting, as pixel information of an interpolation pixel positioned between the discrimination block and the reference block of a high similarity, pixel information generated from the pixel information of pixels of the discrimination block and/or the reference block of the high similarity.

For generating the pixel information of the interpolation pixel based on the pixel information of the pixels of the discrimination block and/or the reference block, there may be adopted a configuration of employing pixel information of a pixel of the discrimination block or the reference block, without change, as the pixel information of the interpolation pixel, or a configuration of calculating the pixel information of the interpolation pixel, by an interpolation calculation such as a linear interpolation utilizing the pixel information of a pixel of the discrimination block and the pixel information of a pixel of the reference block.

Such output circuit may advantageously employ a configuration of outputting pixel information of an interpolation pixel positioned between the reference block and the discrimination block including two pixels constituting an edge portion. Particularly advantageously, there may be adopted a configuration including an edge detection circuit for detecting the edge portion.

Also the output circuit may advantageously employ a configuration of outputting pixel information of two interpolation pixels, respectively adopting the pixel information of the two pixels constituting the aforementioned edge portion in the discrimination block, or a configuration of outputting pixel information of two interpolation pixels, respectively adopting the pixel information of the two pixels, among the plural pixels constituting the aforementioned reference block, corresponding to the aforementioned two pixels constituting the edge portion in the discrimination block.

Also there may be advantageously adopted a configuration in which the interpolation pixel is a pixel at a middle position or a position close thereof of mutually corresponding pixels in the discrimination block and the reference block of the high similarity.

There can also be adopted a configuration including a movement information generating circuit for generating movement information for discriminating a movement of an image, wherein the output circuit outputs the pixel information of the interpolation pixel in case the movement information indicates a movement larger than a predetermined movement. The predetermined movement may be a movement 0. There may be advantageously adopted a configuration, in case the movement is equal to or smaller than the predetermined movement, of employing pixel information for forming a preceding or succeeding image (pixel information of preceding or succeeding field).

Also advantageously there may be adopted a configuration, in case a certain reference is discriminated as a reference of a high similarity to the discrimination block and pixel information of an interpolation pixel between such reference block and the discrimination block is outputted, of inhibiting the use of the reference block as a reference block for a discrimination block close to the aforementioned discrimination block.

Particularly advantageously there may be adopted a configuration in which a structure of the discrimination block and the reference block is different in a case of detection of an edge portion with a line width of one pixel and a case of detection of an edge portion with a line width of two or more pixels.

The present invention also includes a pixel interpolating method including:

a step of discriminating, based on an input image signal, a similarity of a discrimination block formed by plural pixels, and plural reference blocks each formed by plural pixels and positioned close to the discrimination block but shifted upwards or downwards by at least a line with respect to the discrimination block; and a step of outputting, as pixel information of an interpolation pixel positioned between the discrimination block and the reference block of a high similarity, pixel information generated from the pixel information of pixels of the discrimination block and/or the reference block of the high similarity.

The present invention also includes a program for executing such method and a recording medium storing such program.

BRIEF DESCRIPTION OF THE DRAWINGS

FIG. 35 is a schematic view showing a mode, in a segment image, of executing a prior oblique correction process by referring to pixels in an oblique direction about the object pixel.

DETAILED DESCRIPTION OF THE PREFERRED EMBODIMENTS

Figure 30:
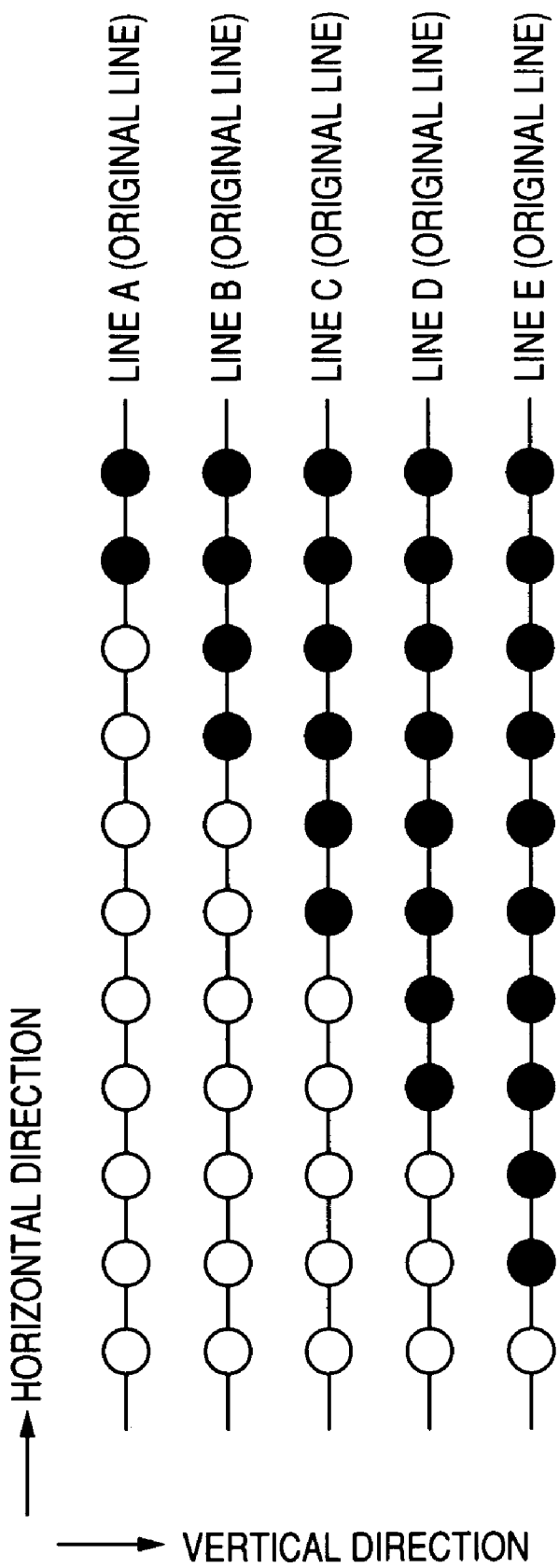
FIG. 30 is a schematic view showing a mode of an image having an edge portion.
Figure 34:
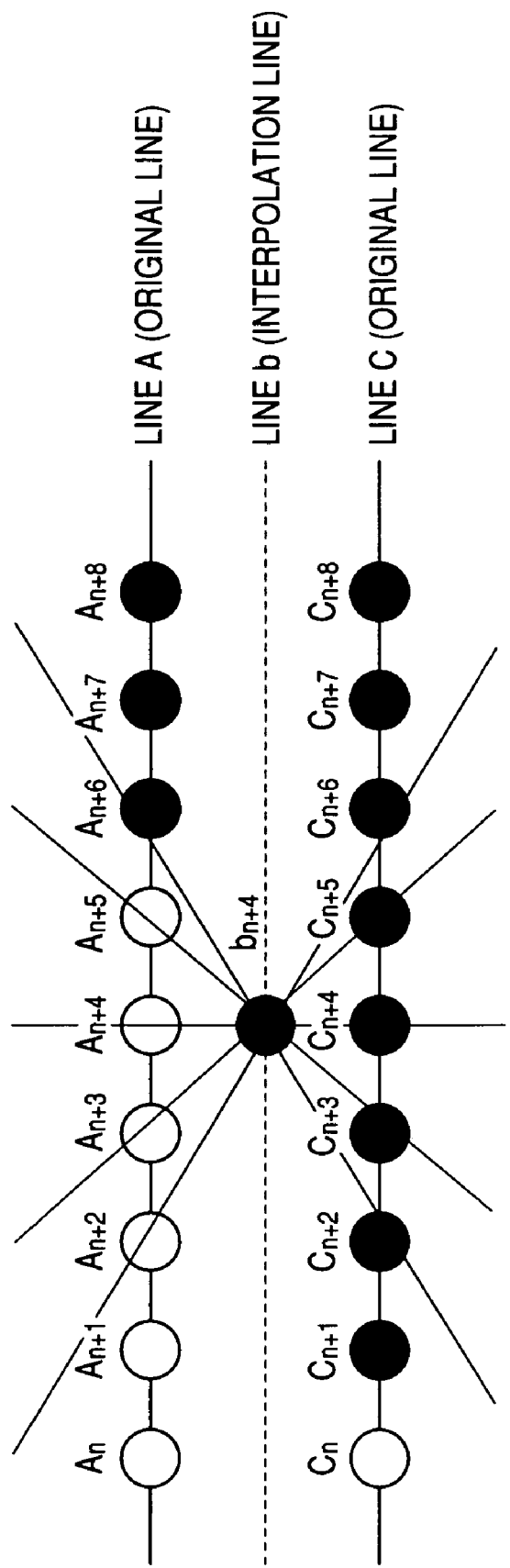
FIG. 34 is a schematic view showing a mode, in an image having an edge portion, of executing a prior oblique correction process by referring to pixels in an oblique direction about the object pixel.

FIG. 34 shows a mode of processing image information, having a slope in an oblique direction as shown in FIG. 30, by a method of referring to combinations of two pixels constituting plural inclined direction with respect to a pixel to be interpolated and determining pixel information the interpolation pixel from a combination having a smaller difference.

Figure 31:
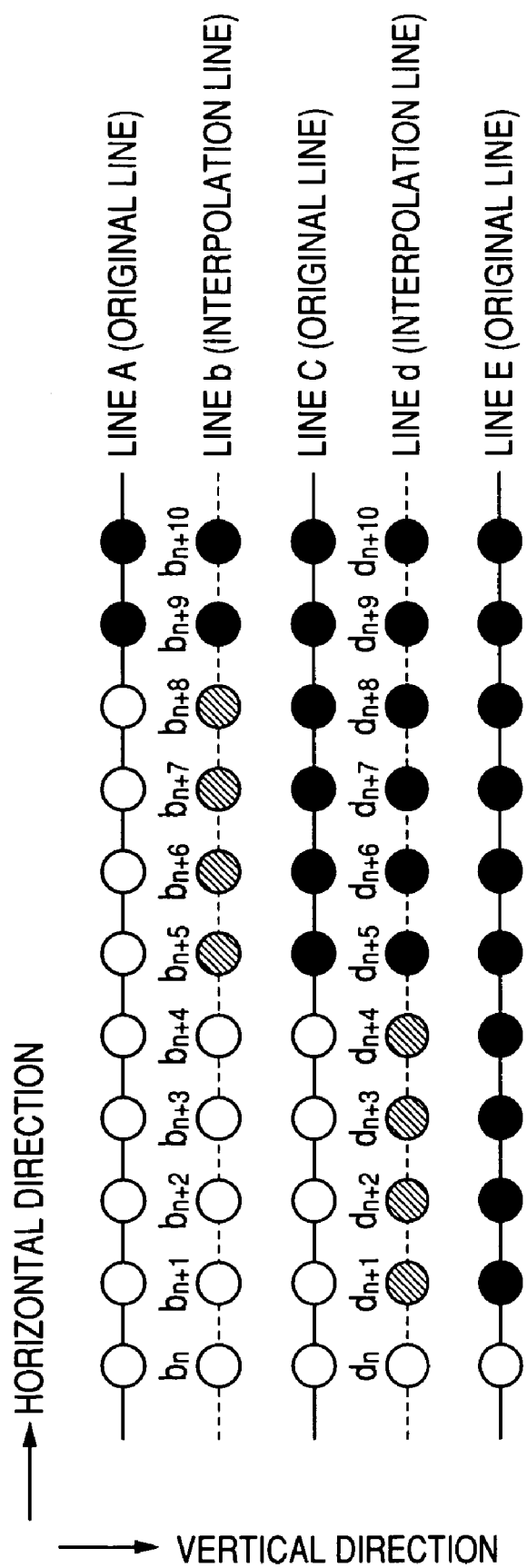
FIG. 31 is a schematic view showing a mode of an intrafield interpolation of an image having an edge portion.

Now referring to FIG. 34 for taking an interpolation pixel $b_{n+4}$ and obtaining a pixel value thereof, reference is made to plural inclined combinations on $b_{n+4}$, namely combinations of $A_{n+4}$ and $C_{n+4}$, $A_{n+3}$ and $C_{n+5}$, $A_{n+5}$ and $C_{n+3}$, $A_{n+2}$ and $C_{n+6}$, and $A_{n+6}$ and $C_{n+2}$, then a combination of a smaller difference namely a combination $A_{n+6}$ and $C_{n+2}$ is selected and an average value of these two pixels is utilized as the pixel value of $b_{n+4}$. Such method enables, on image information having a slope in an oblique direction as shown in FIG. 30, to execute an interpolation process without stepwise changes as shown in FIG. 31.

Figure 32:
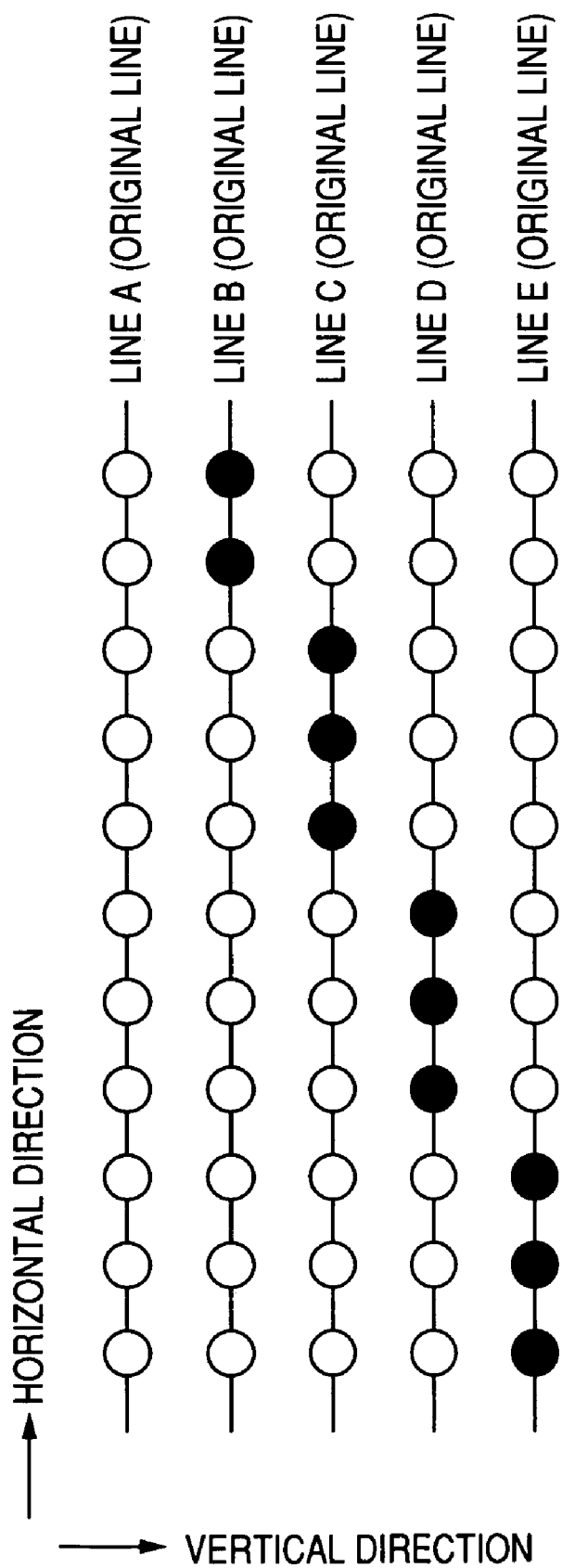
FIG. 32 is a schematic view showing a mode of a segment image.
Figure 33:
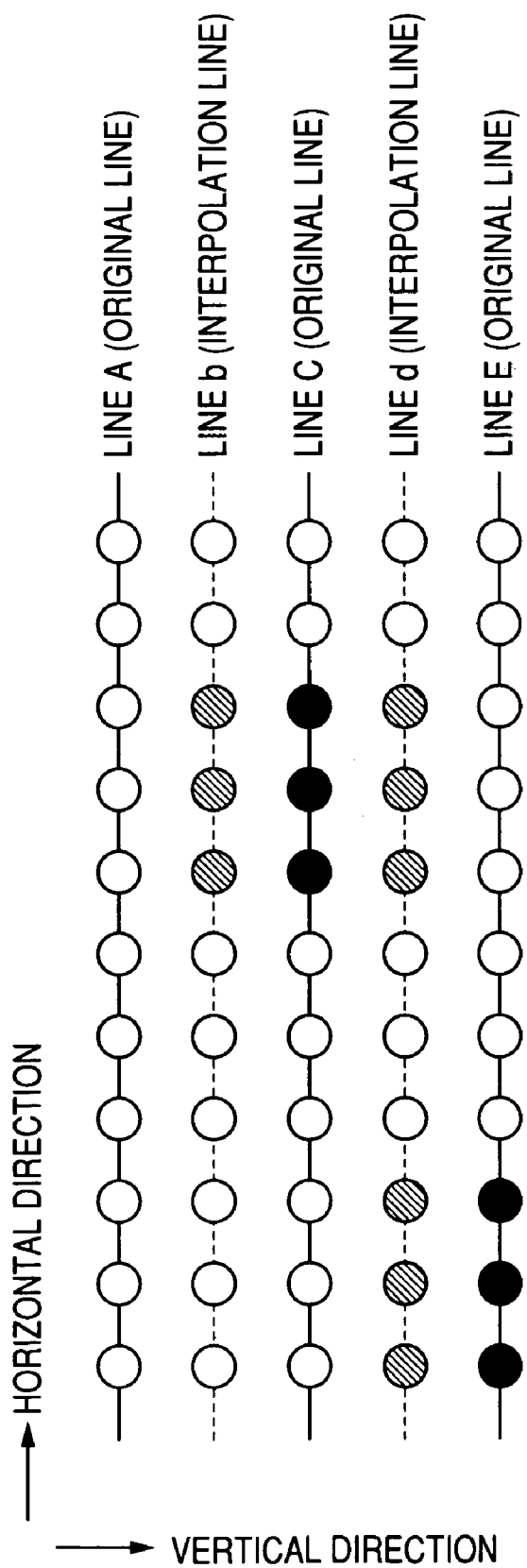
FIG. 33 is a schematic view showing a mode of an intrafield interpolation of a segment image.

On the other hand, FIG. 35 shows a mode of application of this method on the image information of an oblique line having a line width corresponding to a pixel, as shown in FIG. 32.

Now referring to FIG. 35 for taking an interpolation pixel $b_{n+4}$ and obtaining a pixel value thereof as in FIG. 34, by referring to plural inclined combinations on $b_{n+4}$, namely combinations of $A_{n+4}$ and $C_{n+4}$, $A_{n+3}$ and $C_{n+5}$, $A_{n+5}$ and $C_{n+3}$, $A_{n+2}$ and $C_{n+6}$, and $A_{n+6}$ and $C_{n+2}$, and trying to select a combination of a smaller difference, such combination of a smaller difference cannot be specified as all the combinations have a same difference. Thus, in such case, there cannot be applied a method of referring to combinations of two pixels constituting plural inclined directions on the pixel to be interpolated and determining the pixel information of the interpolation pixel from a combination of a smaller difference.

Such situation is to be considered in the following embodiment. More specifically, the following embodiment discloses a configuration capable of realizing an interpolation/correction process capable, on image information having a slope in an oblique direction, of generating image information retaining smoothness. There is also disclosed an embodiment capable of realizing an interpolation/correction process capable, also on image information of an oblique line having a line width corresponding to one pixel, of obtaining a smoothly continuous oblique line.

More specifically, for example for image information, having a slope in an oblique direction or image information of an oblique line of a line width corresponding to one pixel, inputted as image information by an interlaced scanning method and converted into image information of progressive scanning method thereby resulting in image information of a unsmooth stepwise shape or a broken line instead of an original oblique line having pixel values continuously, the following embodiment generates a discrimination block constituted of pixels in plural lines inputted by the interlaced scanning method within a field to be corrected and serving as a base of a correction process, also generates plural reference blocks which are inputted later than the discrimination block and which are displaced upwards or downwards by a line, then executes a comparison of pixel information between the discrimination block and each of the plural reference blocks, and, in case of detecting a matching, executes a correction of the pixel information in an interpolation pixel positioned between the discrimination block and a reference block on which the matching is detected, whereby the pixel information in the interpolation pixel generated as the stepwise image information or the pixel information in the interpolation pixel lacking in the oblique line having pixel values continuously can be corrected to provide image information having the slope in the oblique direction and retaining the original smoothness, or image information displayed as an original continuous oblique line.

Also by a generation of correction data of two pixels at the same time for information of a discrimination block, it is possible to execute the correction in a single correction process instead of two correction process to be executed on the image information having a slope in the diagonal direction or the image information of an oblique line having a line width corresponding to a pixel.

First Embodiment

Figure 1:
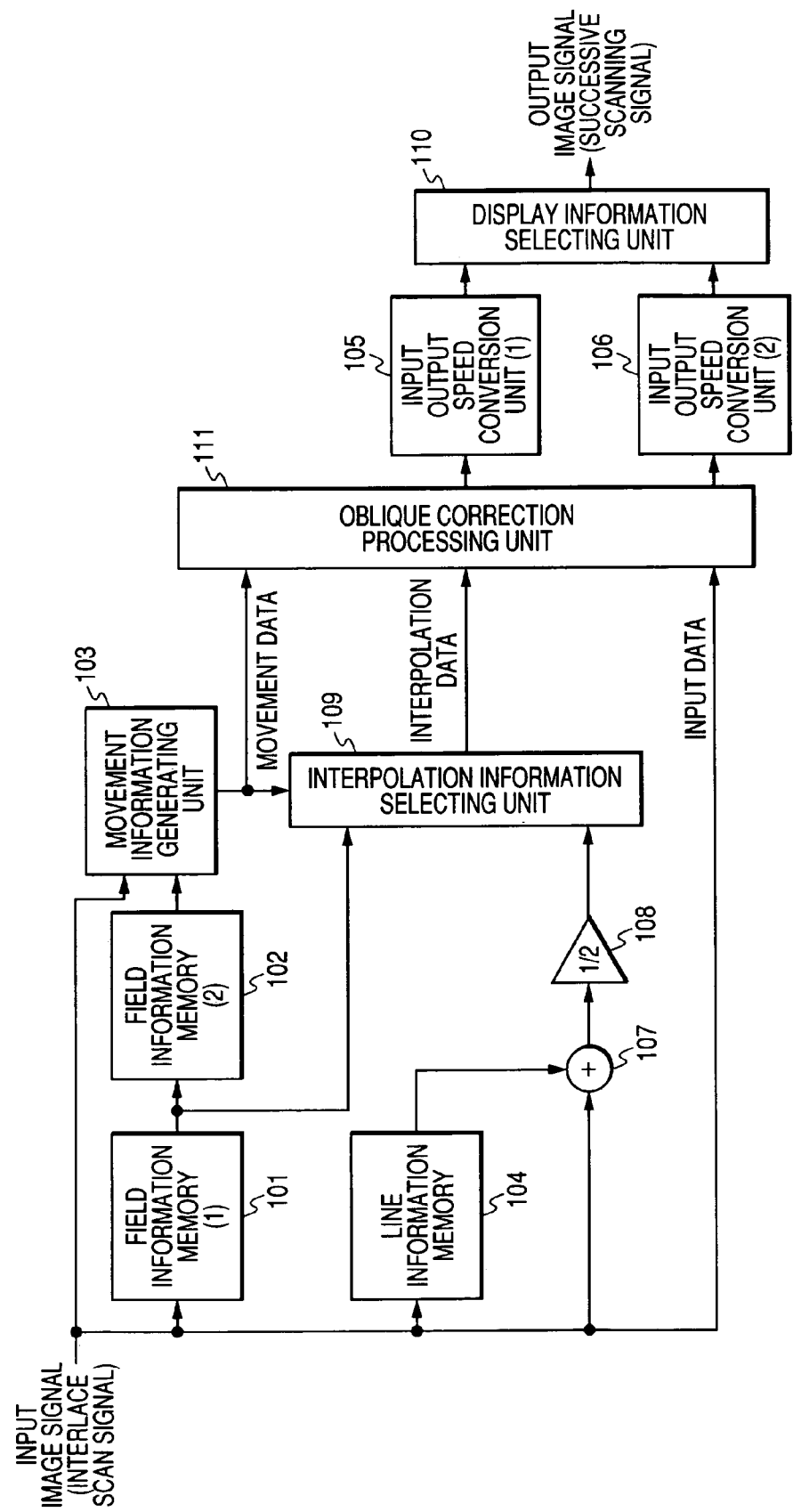
FIG. 1 is a block diagram showing a configuration of a movement information generator in a first embodiment of the present invention.

FIG. 1 is a block diagram showing a configuration of an IP conversion process circuit constituting an embodiment of the present invention.

Figure 27:
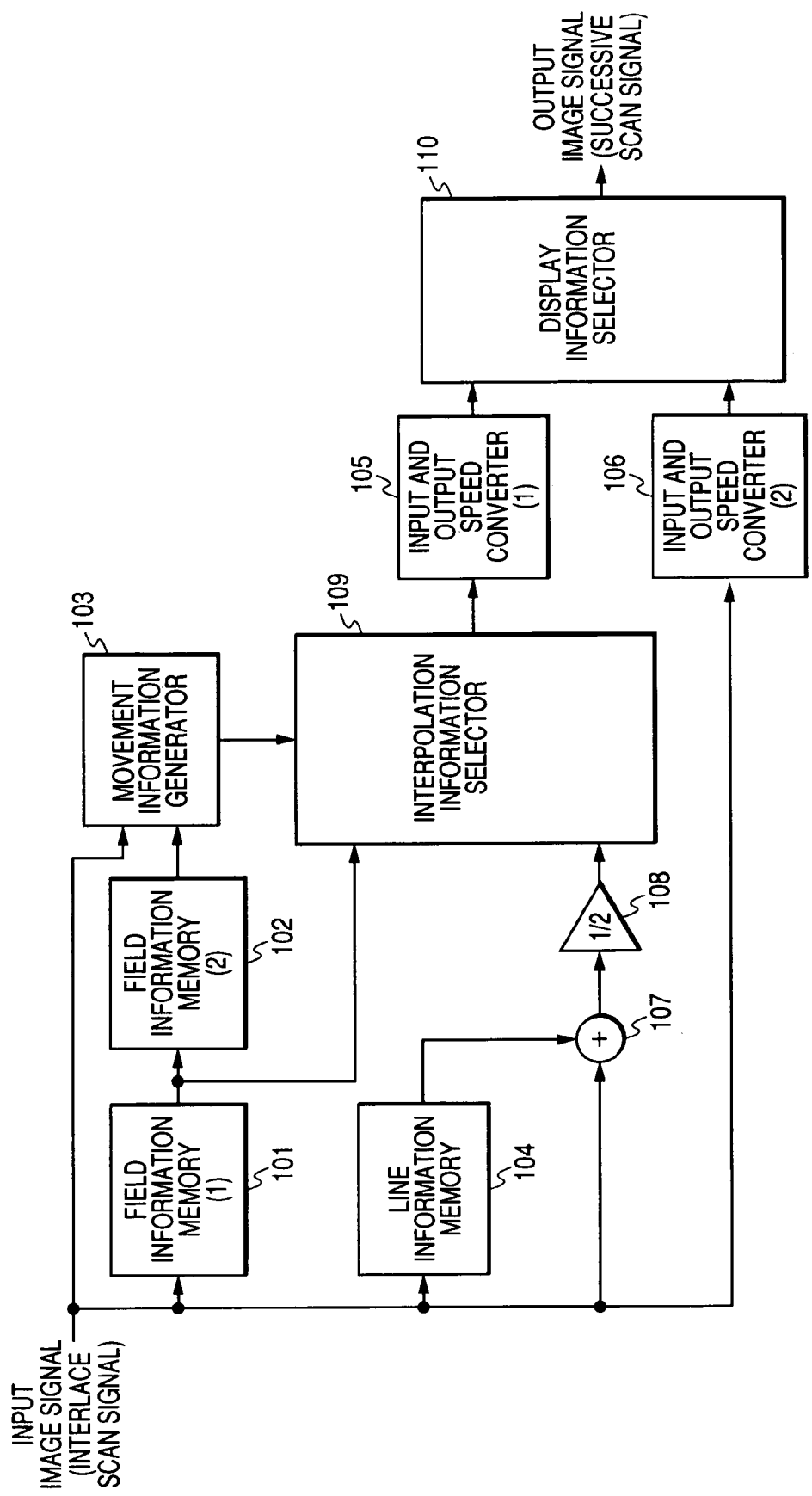
FIG. 27 is a block diagram showing a configuration of a prior IP conversion process circuit.
Figure 28A:
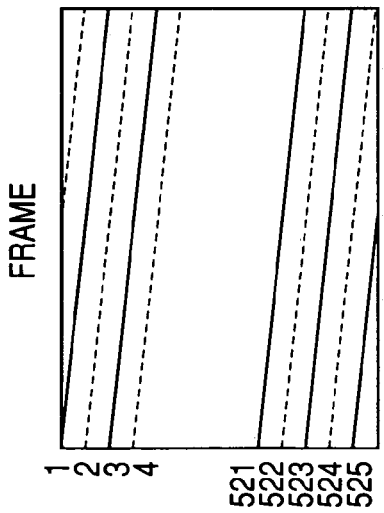
FIGS. 28A, 28B and 28C are schematic views showing a mode of display of image information of an interlaced scanning method.
Figure 28B:
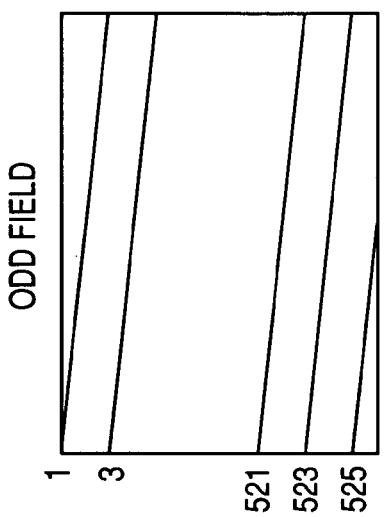
Figure 28C:
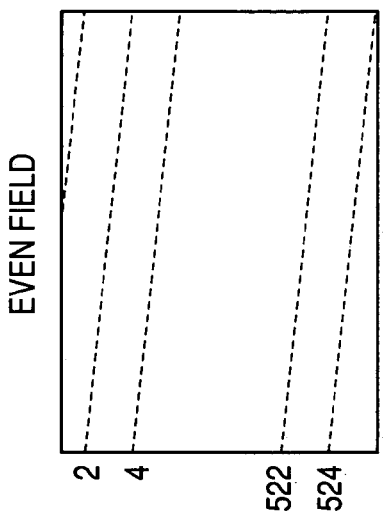
Figure 29:
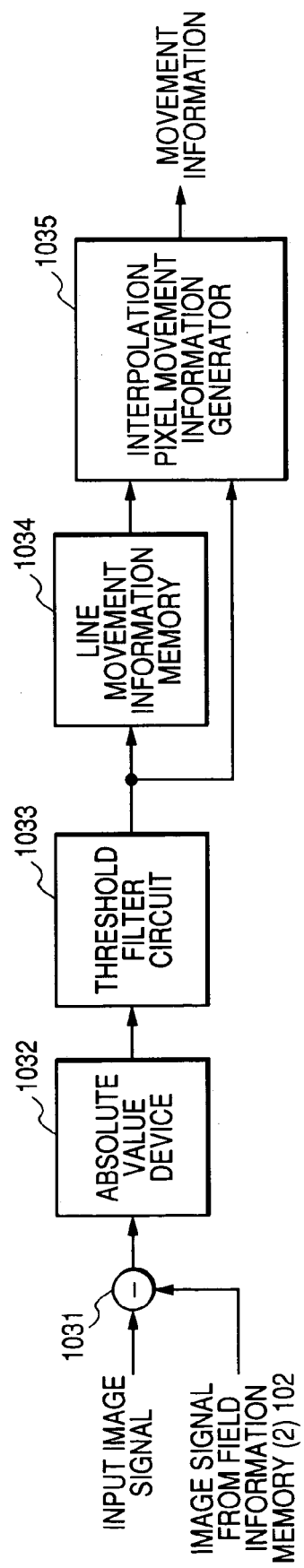
FIG. 29 is a block diagram showing a configuration of a prior movement information generator.

Referring to FIG. 1, a field information memory (1) 101, a field information memory (2) 102, a movement information generator 103, a line information memory 104, an input/output speed converter (1) 105, an input/output speed converter (2) 106, an adder 107, a divider 108, an interpolation information selector 109 and a display information selector 110 are similar to those explained in the prior IP conversion process circuit in FIG. 27. In the present embodiment, an oblique correction processing unit 111 is added in front of the input/output speed converter (1) 105 and the input/output speed converter (2) 106, and such oblique correction processing unit 111 receives an input image information, interpolation information outputted from the interpolation information selector 109 and movement information on the interpolation pixel outputted from the movement information generator 103, then executes a correction process, based on these information, on the interpolation information having a slope in the oblique direction as will be explained in the following, and outputs the input image information and interpolation information to the input/output speed converter (1) 105 and the input/output speed converter (2) 106. The field information memory (1) 101 constitutes interfield interpolation pixel generating means of the present invention. Also the line information memory 104, the adder 107 and the divider 108 constitute in-field interpolation pixel generating means of the present invention. Also the movement information generator 103 constitutes movement information generating means of the present invention. Further, the interpolation information selector 109 constitutes interpolation pixel information selecting means of the present invention.

(Structure of Oblique Correction Processor)

Figure 2:
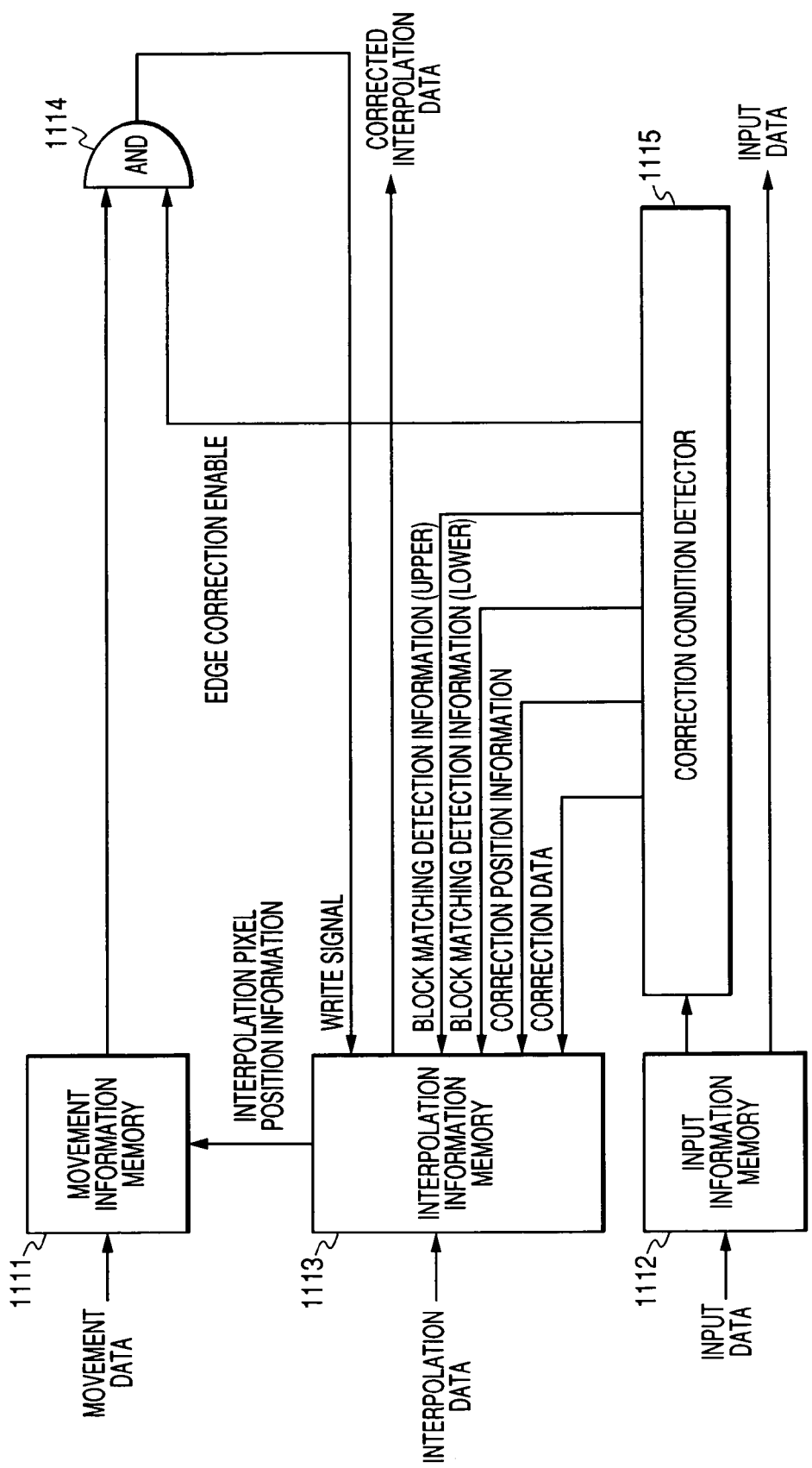
FIG. 2 is a block diagram showing a configuration of an oblique correction processing unit in a first embodiment of the present invention.

FIG. 2 is a block diagram showing an example of the oblique correction processor 111 in the present embodiment, in which the oblique correction processor 111 constitutes the pixel correction apparatus of the present invention.

Referring to FIG. 2, a movement information memory 1111 is capable of storing, for plural lines, movement information at the interpolation pixel outputted from the movement information generator 103. An input information memory 1112 is capable of storing, for plural lines, the image information of the interlaced scanning method inputted into the IP conversion processing circuit. An interpolation information memory 1113 is capable of storing, for plural lines, the interpolation information outputted from the interpolation information selector 109. An AND element 1114 obtained a logic product of two input signals. A correction condition detector 1115 discriminates matching/unmatching of pixel information in the unit of a block constituted of plural pixels.

Figure 7:
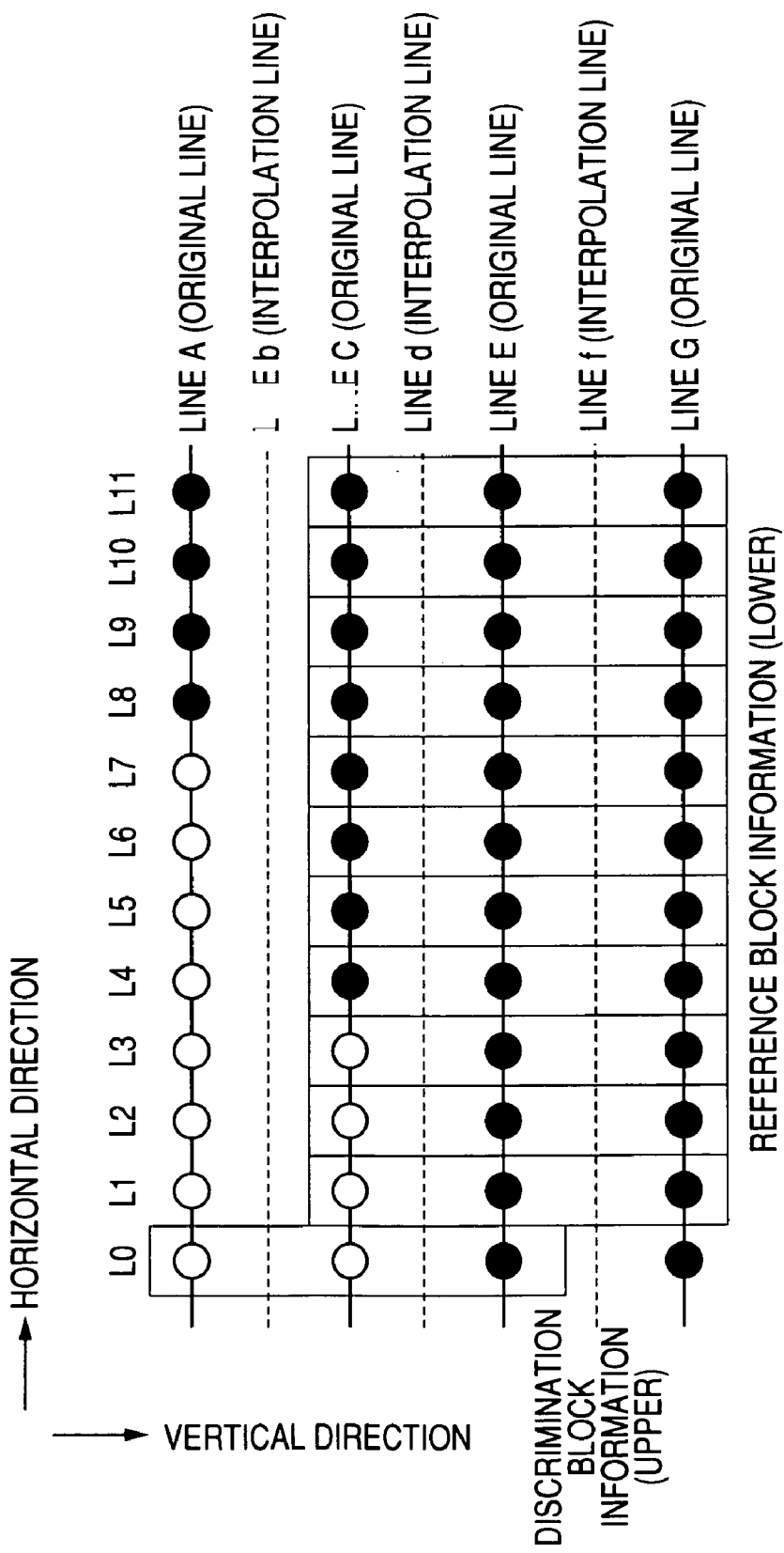
FIG. 7 is a schematic view showing a mode of matching detection between discrimination block information (upper) and reference block information (lower) in the first embodiment of the present invention.
Figure 8:
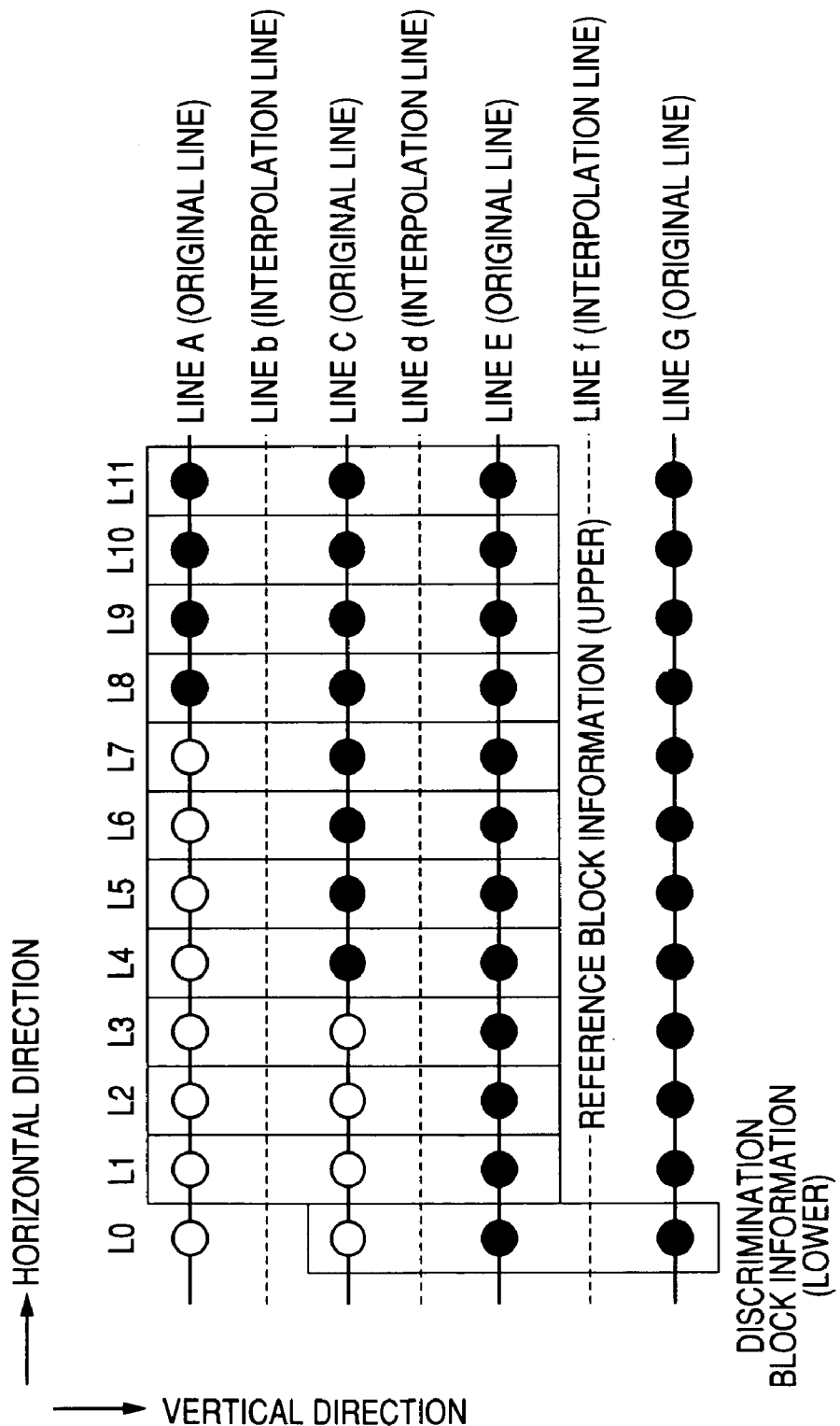
FIG. 8 is a schematic view showing a mode of matching detection between discrimination block information (lower) and reference block information (upper) in the first embodiment of the present invention.

In the present embodiment, as shown in FIG. 7 or 8, the input information memory 1112 stores input image information of 4 lines, namely lines A, C, E and G, while the interpolation information memory 1113 stores interpolation information of 3 lines, namely lines b, d and f positioned between the lines of the input image information stored in the input information memory 1112, and the movement information memory 1111 stores movement information at interpolation pixels of 3 lines corresponding to the interpolation information stored in the interpolation information memory 1113. The AND element 1114, when two input signals are both in high-level conditions, outputs a high-level signal thereby activating a write signal to the interpolation information memory 1113. More specifically, when the movement information memory 1111 outputs the movement information at an interpolation pixel to be corrected as a moving image (high-level) and the correction condition detector 1115 outputs an edge correction enable signal at an active level (high-level), a write signal of an active level (high-level) is outputted to the interpolation information memory 1113. The interpolation information memory 1113 outputs position information of the interpolation pixel, specified by block matching detection information (upper), block matching detection information (lower) and correction position information outputted from the correction condition detector 1115, to the movement information memory 1111, and, in case the write signal from the AND element 1114 is at the active level (high level), rewrites the pixel information at the position information of thus specified interpolation pixel with correction data outputted from the correction condition detector 1115. The interpolation information memory 1113 outputs the corrected interpolation data to the input/output speed converter (1) 105, and the input information memory 1112 outputs, to the input/output speed converter (2) 106, input information delayed by a time required for the correction process on the input interpolation information.

The mode of the briefly explained processing in the oblique correction processor 111 will be explained in more details.

(Entire Structure of Correction Condition Detector)

Figure 3:
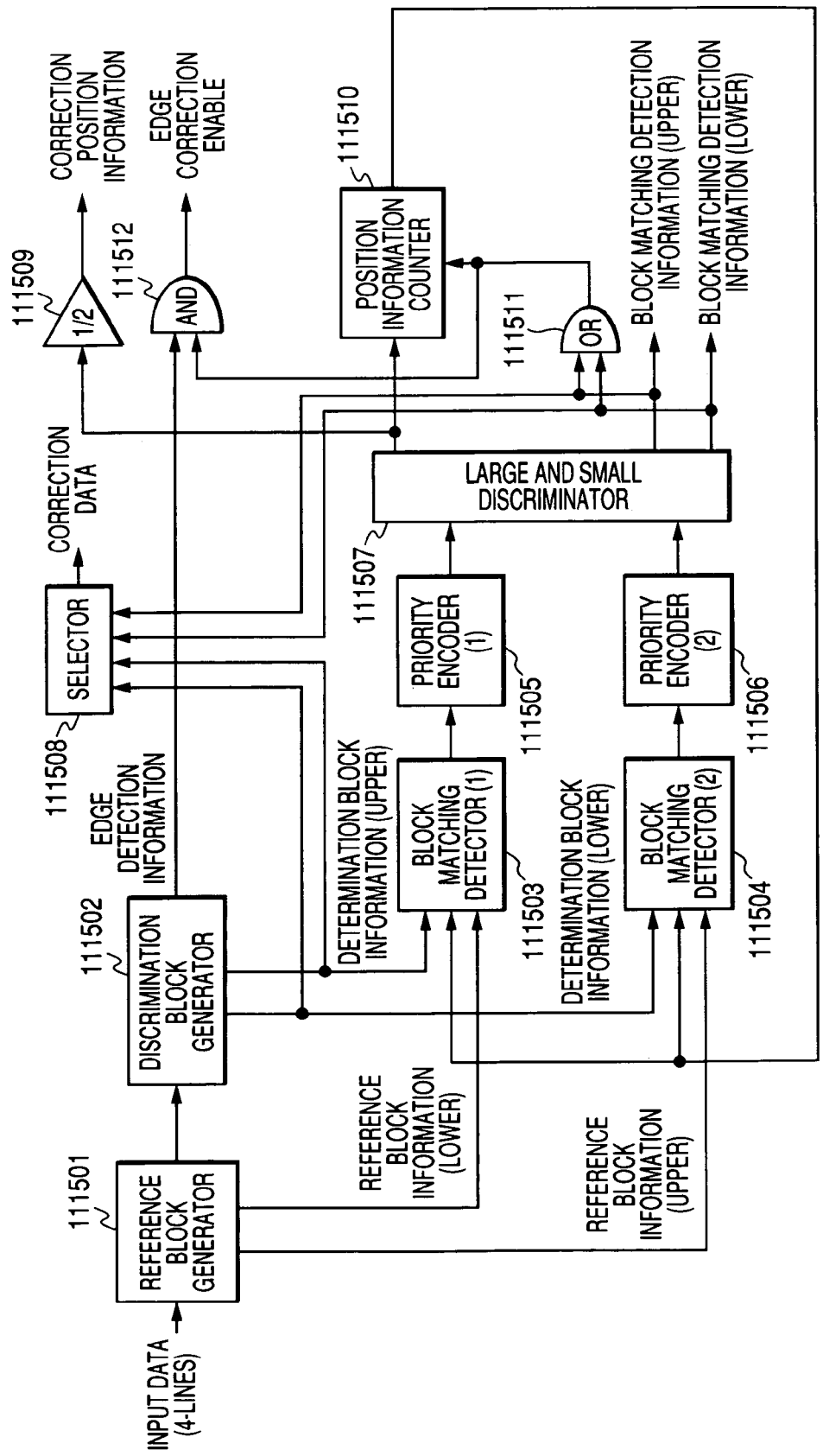
FIG. 3 is a block diagram showing a configuration of a correction condition detector in a first embodiment of the present invention.

FIG. 3 is a block diagram showing a configuration of the correction condition detector 1115 in the present embodiment.

Referring to FIG. 3, a reference block generator 111501 generates plural sets of reference block information constituted of plural pixels, for discriminating matching/unmatching of discrimination block information to be explained later and pixel information. A discrimination block generator 111502 generates discrimination block information serving as a base for discriminating matching/unmatching of plural sets of reference block information outputted from the reference block generator 111501 and the pixel information. Block matching detectors 111503, 111504 execute matching/unmatching discrimination between the discrimination block information outputted from the discrimination block generator 111502 and each of the plural sets of reference block information outputted from the reference block generator 111501, and output a result for each reference block information. Priority encoders 111505, 111506 output position information of a reference block for which a matching is detected for the first time, based on the result of matching/unmatching discrimination for each reference block information, outputted from the block matching detector (1) 111503 and the block matching detector (2) 111504. A large/small discriminator 111507 selects and outputs position information of a smaller value, among the position information outputted from the priority encoder (1) 111505 and the priority encoder (2) 111506. A selector 111508 selects and outputs discrimination block information outputted from the discrimination block generator 111502, according to block matching detection information (upper) and block matching detection information (lower) outputted from the large/smaller discriminator 111507. A divider 111509 determines a half of the position information selected and outputted by the large/small discriminator 111507. A position information counter 111510 stores the position information selected and outputted by the large/small discriminator 111507 and executes a count-down operation. An OR element 111511 determines a logic sum of two input signals. An AND element 111512 determines a logic product of two input signals.

(Function of Correction Condition Detector)

In the following, there will be explained a function of the correction condition detector 1115 of the present embodiment, having the above-described structure.

(Reference Block Generator)

The reference block generator 111501 is principally constituted of memory elements such as flip-flops, for storing the input image information, outputted from the input information memory 1112, by plural pixels for each line. The reference block generator 111501 generates and outputs in succession the reference block information under a shifting of the input image information inputted from the input information memory 1112, and outputs the image information after the shifting process to the discrimination block generator

111502 in a subsequent stage. The reference block generator 111501 and the discrimination block generator 111502 constitute specifying means of the present invention.

Figure 4:
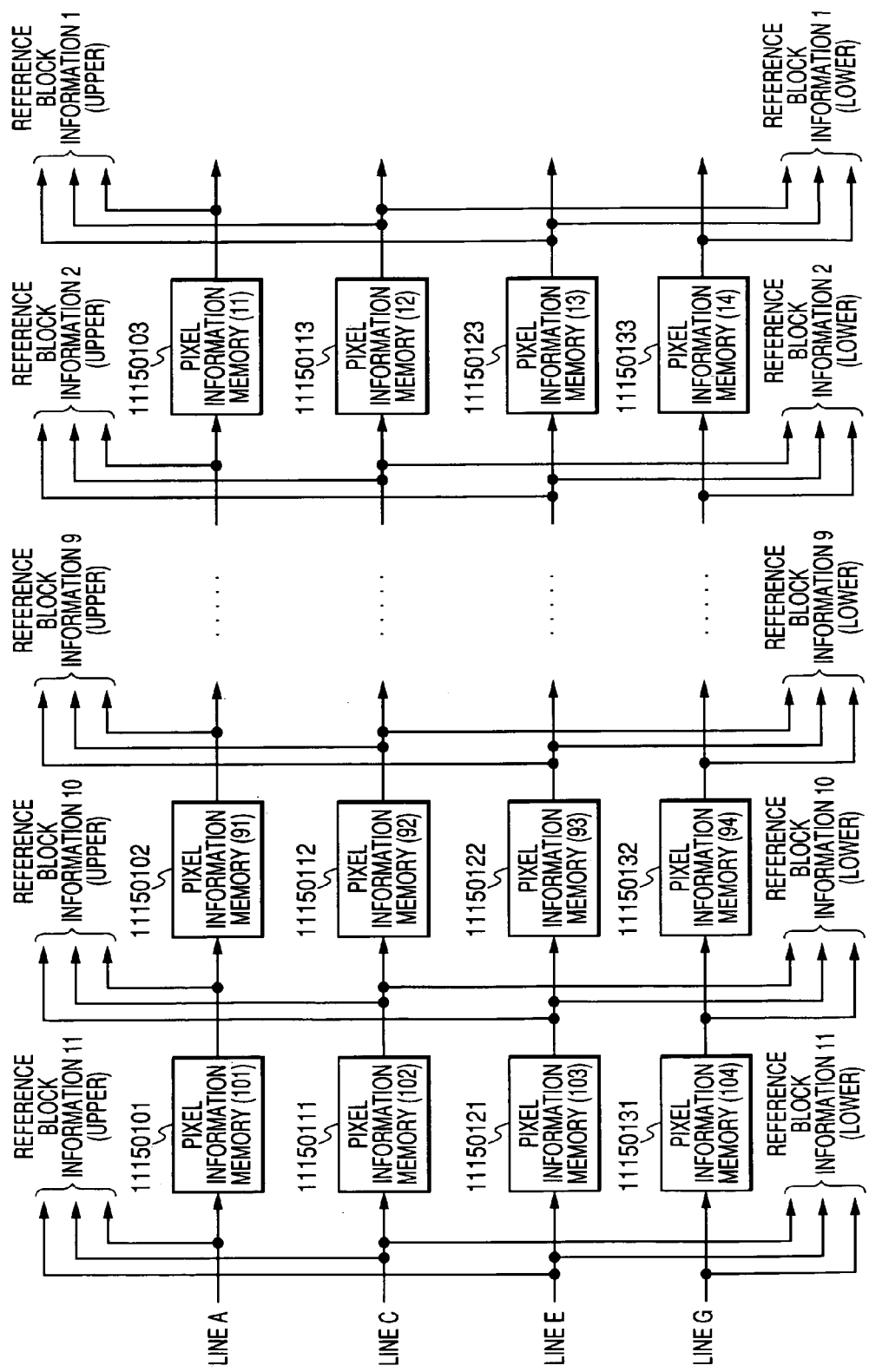
FIG. 4 is a block diagram showing a configuration of a reference block generator in a first embodiment of the present invention.

FIG. 4 is a block diagram showing a configuration of the reference block generator 111501 in the present embodiment.

Referring to FIG. 4, pixel information memories 11150101-11150103, 11150111-11150113, 11150121-11150123 and 11150131-11150133 store the input image information. The image information stored in the pixel information memories are shifted in succession to the succeeding image information memories at each output timing of the image information from the input information memory 1112. A number of the pixel information memories per a line is variable by a distance of a reference block to be referred to by a number of pixels from the position of the block to be discriminated. In the present embodiment, as shown in FIG. 7, a pixel positioned at L0 is used as a discrimination block and blocks from L1 to L11 are used as the reference blocks, so that the number of the pixel information memories required for each line is 10.

Referring again to FIG. 4, the reference block generator 111501 generates and outputs each reference block from the input image information and the image information stored in the pixel information memories. In the present embodiment, as shown in FIGS. 7 and 8, reference block information (upper) constituted of pixel information of three lines A, C and E and reference block information (lower) constituted of pixel information of three lines C, E and G are outputted as reference blocks respectively corresponding to reference positions L1 to L11. Also a pixel information memory (11) 11150103, a pixel information memory (12) 11150113, a pixel information memory (13) 11150123, and a pixel information memory (14) 11150133 positioned at a last stage in the respectively lines execute outputs to the discrimination block generator 111502 provided in a stage subsequent to the reference block generator 111501.

(Discrimination Block Generator)

Again referring to FIG. 3, the discrimination block generator 111502 generates discrimination block information as a base for discriminating matching/unmatching of the pixel information from the image information outputted from the reference block generator 111501, then judges whether an edge portion is present in the discrimination block information and outputs a result as edge detection information. The discrimination block generator 111502 constitutes edge detection means of the present invention.

Figure 5:
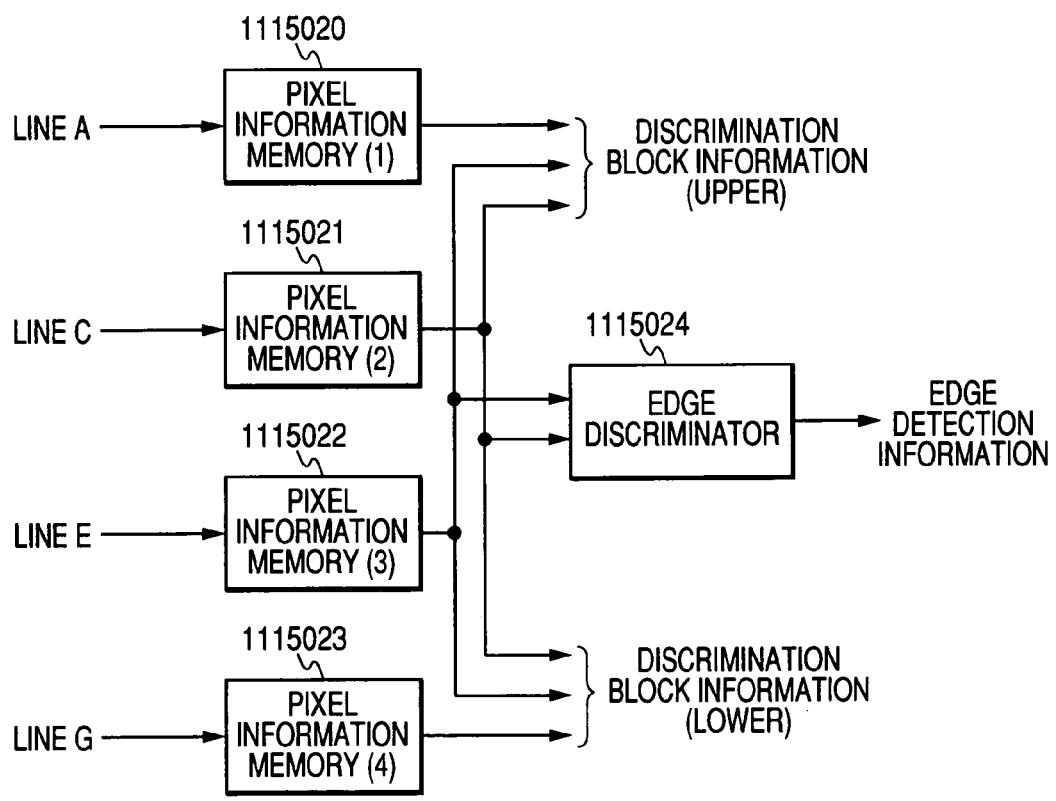
FIG. 5 is a block diagram showing a configuration of a discrimination block generator in a first embodiment of the present invention.

FIG. 5 is a block diagram showing a configuration of the discrimination block generator 111502.

Referring to FIG. 5, pixel information memories 1115020-1115023 store input image information. The image information stored in each pixel information memory is renewed at an output timing of the image information from the reference block generator 111501. The discrimination block generator 111502 generates and outputs discrimination block information from the image information stored in the pixel information memories. In the present embodiment, there are outputted a discrimination block information (upper) constituted of pixel information of three lines A, C and E and a discrimination block information (lower) constituted of pixel information of three lines C, E and G as the discrimination blocks. Also in the discrimination block generator 111502, an edge discriminator 1115024 judges whether an edge portion is present between the lines C and E, based on difference information of the pixels on the lines C and E, among the input pixel information of 4 lines, and outputs a result of such discrimination as edge detection information.

(Block Matching Detector)

Again referring to FIG. 3, the block matching detector (1) 111503 executes a pixel-to-pixel comparison of the discrimination block information (upper) outputted from the discrimination block generator 111502 with each of the reference block information (lower) positioned from L1 to L11, outputted from the reference block generator 111501, and outputs a matching/unmatching result of discrimination for each reference block information. The block matching detector (1) 111503 and the block matching detector (2) 111504 constitute discrimination means of the present invention.

FIG. 7 shows a positional relationship between the discrimination block information (upper) and the reference block information (lower) processed in the block matching detector (1) 111503. Also FIG. 6 is a block diagram showing a configuration of the block matching detector (1) 111503 in the present embodiment.

Figure 6:
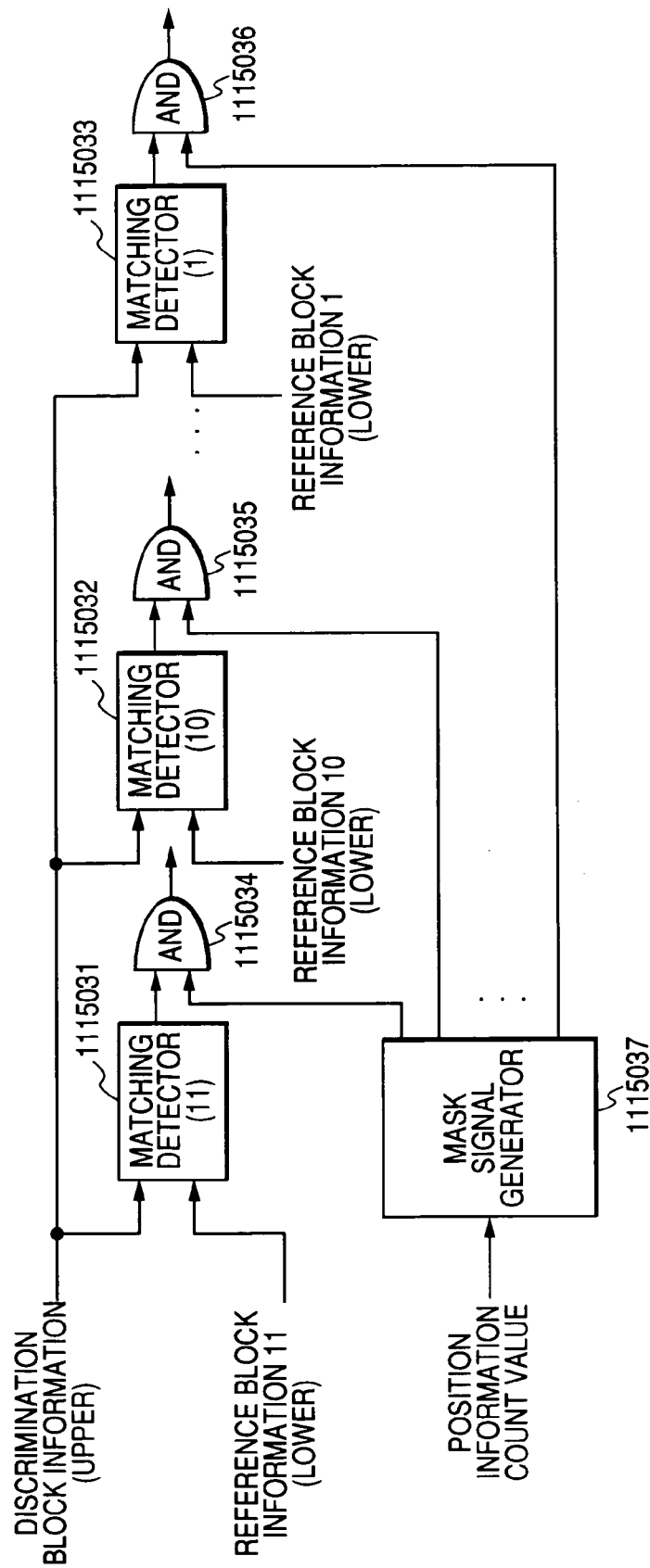
FIG. 6 is a block diagram showing a configuration of a block matching detector in a first embodiment of the present invention.

Referring to FIG. 6, matching detectors 1115031-1115033 execute a matching/unmatching discrimination by a pixel-to-pixel comparison of the discrimination block information (upper) outputted from the discrimination block generator 111502 and the reference block information (lower) outputted from the reference block generator 111501. In the present embodiment, as the reference block generator 111501 outputs the reference block information (lower) positioned from L1 to L11 as shown in FIG. 7, the matching detector is provided in 11 units respectively corresponding to the reference block information (lower). AND elements 1115034-1115036, each determining a logic product of two input signals, are respectively coupled with the matching detectors. A mask signal generator 1115037 decodes a count outputted from the position information counter 111510 and generates a mask signal for masking the result of discrimination outputted from the matching detector in response to the count of the position information counter 111510. The mask signal generator 1115037 regards the count outputted from the position information counter 111510 as indicating the position of the reference block information (lower), and outputs a mask signal to each matching detector so as to shift the matching/unmatching discrimination result in the reference block information (lower) of a position smaller than the count outputted from the position information counter 111510 forcedly to an unmatching result, thereby avoiding a situation that reference block information (lower), which is discriminated as matching in the past is referred to again when the discrimination block information (upper) outputted from the discrimination block generator 111502 is renewed to new information. The position information counter 111510 and the mask signal generator 1115037 constitute alteration means of the present invention, and the position information counter 111510 constitutes holding means of the present invention.

Again referring to FIG. 3, the block matching detector (2) 111504 executes a pixel-to-pixel comparison of the discrimination block information (lower) outputted from the discrimination block generator 111502 with each of the reference block information (upper) positioned from L1 to L11, outputted from the reference block generator 111501, and outputs a matching/unmatching result of discrimination for each reference block information. This configuration is same as that of the block matching detector (1) 111503 shown in FIG. 6. FIG. 8 shows a positional relationship between the discrimination block information (lower) and the reference block information (upper) processed in the block matching detector (2) 111504.

(Priority Encoder)

A priority encoder (1) 111505 and a priority encoder (2) 111506 respectively receive the matching/unmatching discrimination results outputted from the block matching detector (1) 111503 and the block matching detector (2) 111504, then detects, among the matching/unmatching discrimination results from L1 to L11, a matching discrimination result in reference block information of a smaller distance from the discrimination block, and outputs position information thereof. In the present embodiment, a hexadecimal number "1" is outputted in case a matching is detected between the discrimination block information and the reference block information positioned at L1, also a hexadecimal number "B" is outputted in case a matching is detected between the discrimination block information and the reference block information positioned at L11, and a number "F" is outputted in case a matching is not detected.

(Large/Small Discriminator)

The large/small discriminator 111507 compares the values outputted from the priority encoder (1) 111505 and the priority encoder (2) 111506, and selects and outputs a smaller one. A value outputted from the large/small discriminator 111507 is halved to the divider 111509 and is outputted as correction position information. Also the large/small discriminator 111507 indicates which output is selected, by reflecting it in block matching detection information (upper) or block matching detection information (lower) More specifically, in case a value outputted from the priority encoder (1) 111505 is selected, there are outputted block matching detection information (upper) as "1" and block matching detection information (lower) as "0". Also in case a value outputted from the priority encoder (2) 111506 is selected, there are outputted block matching detection information (upper) as "0" and block matching detection information (lower) as "1". Also in case a matching is not detected in any of the reference blocks and the large/small discriminator 111507 outputs a value "F", both the block matching detection information (upper) and the block matching detection information (lower) are outputted as "0". In case the block matching detector (1) 111503 or the block matching detector (2) 111504 detects a matching in any of the reference blocks to output "1" in any of the block matching detection information (upper) and the block matching detection information (lower), the OR element 111511 outputs "1" to the position information counter 111510.

(Position Information Counter)

The position information counter 111510 utilizes the signal outputted from the OR element 111511 as a load enable signal, and, in case of an output "1", fetches a value outputted from the large/small discriminator 111507 as a counter value. Also in case a matching is not detected in any of the reference blocks and a value "0" is outputted from the OR element 111511, it decreases the counter value by "1", and in case a value "0" is outputted from the OR element 111511 in a state of a counter value "0", it retains a counter value "0".

(Selector)

The selector 111508 selects either of the discrimination block information (upper) and the discrimination block information (lower) outputted from the discrimination block generator 111502 and outputs it as correction data, according to the block matching detection information (upper) and the block matching detection information (lower) outputted from the large/small discriminator 111507. More specifically, in case the block matching information (upper) or the block matching information (lower) is "1", the discrimination block information (upper) or the discrimination block information (lower) is respectively selected and outputted as the correction data. In case a matching is not detected in any of the reference blocks and the block matching information (upper) and the block matching information (lower) are both "0", either of the discrimination block information (upper) and the discrimination block information (lower) may be selected and the function of the oblique correction processor 111 is not influenced by such selection.

(Edge Correction Enable Signal)

The AND element 111512 outputs an edge correction enable signal "1" in case the edge detection information outputted from the discrimination block generator 111502 and the output signal from the OR element 111511 are "1". More specifically, in case the discrimination block information outputted from the discrimination block generator 111502 includes edge information and a block with matching pixel information with the discrimination block information is detected among the plural reference block information outputted from the reference block generator 111501, an edge correction enable signal "1" is outputted indicating that conditions for executing a correction process in the correction condition detector 1115 become ready.

(Correction Process in Interpolation Information Memory)

Again referring to FIG. 2 and in case an edge correction enable signal "1" is outputted from the correction condition detector 1115 and the movement information in a pixel to be corrected, outputted from the movement information memory 1111, indicates a moving image, the AND element 1114 outputs a write signal "1" to the interpolation information memory 1113 for executing a correction process. When a write signal "1" is outputted from the AND element 1114, the interpolation information memory 1113 rewrites the interpolation information, in a position specified by the correction position information outputted from the correction condition detector 1115 and the block matching detection information (upper) and the block matching detection information (lower), with the correction data outputted from the correction condition detector 1115. The interpolation information memory 1115 constitutes correction means of the present invention.

(Correction Process for Interpolation Information)

Figure 9:
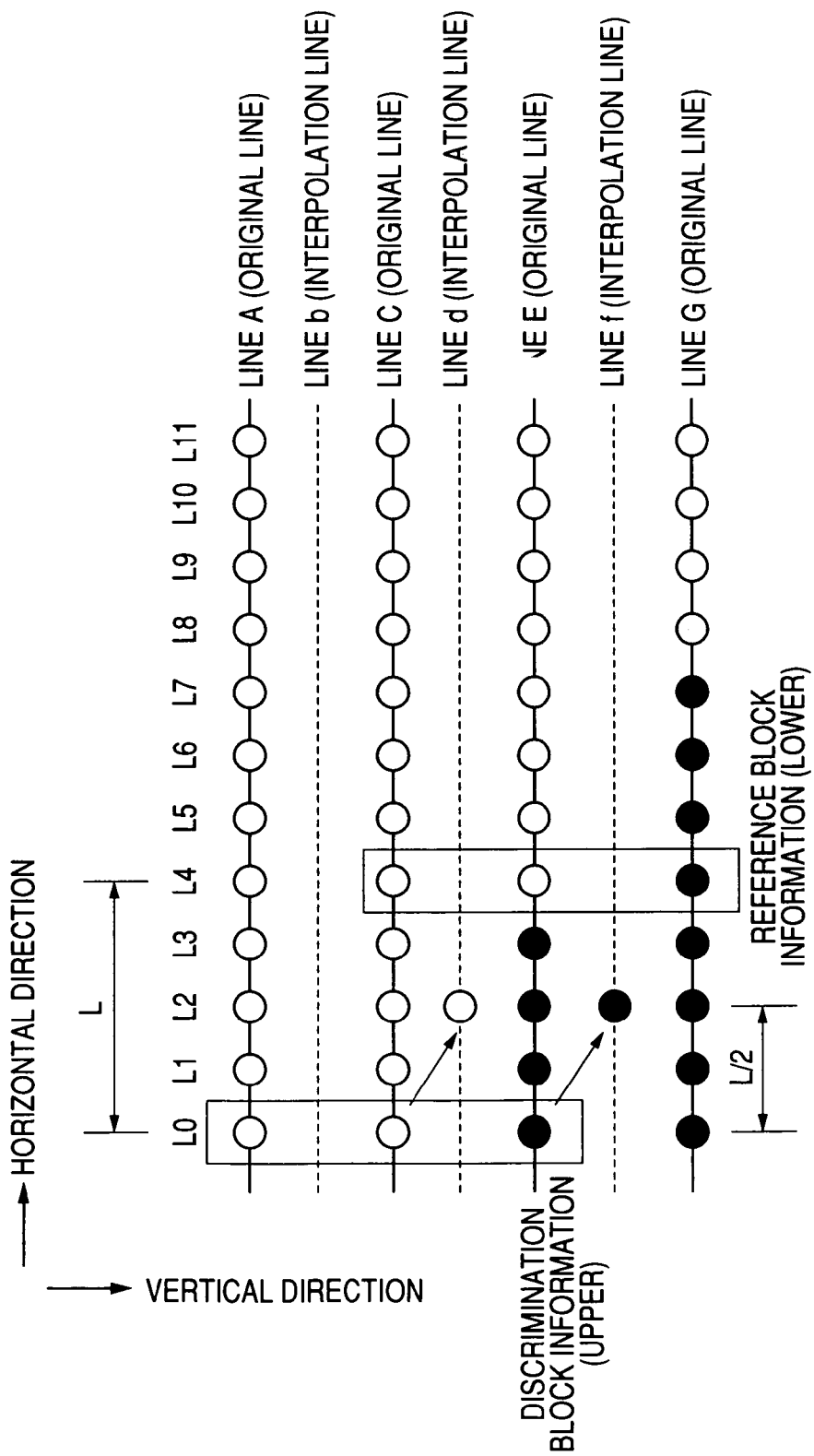
FIG. 9 is a schematic view showing a mode of oblique correction between discrimination block information (upper) and reference block information (lower) in the first embodiment of the present invention.
Figure 10:
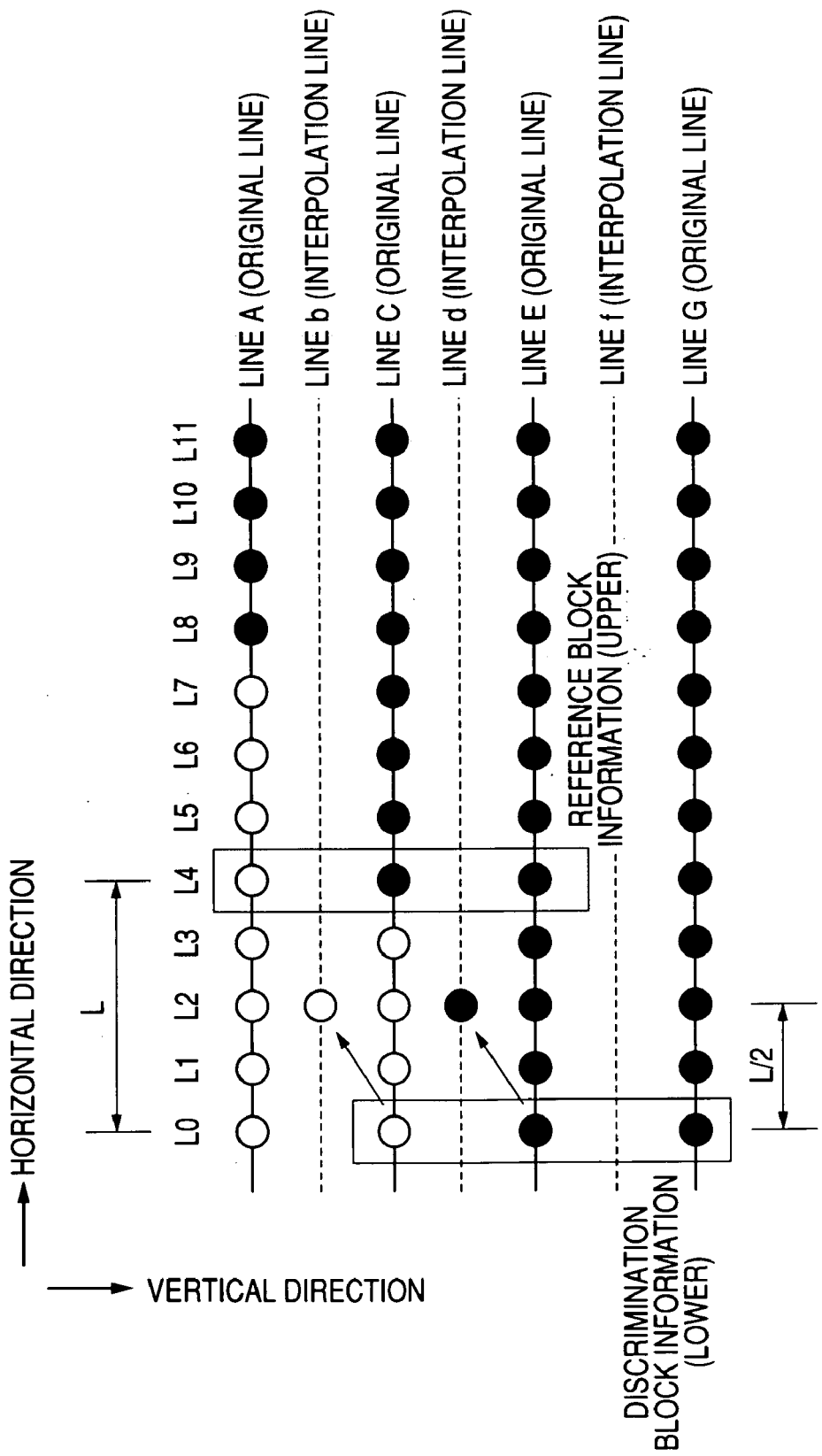
FIG. 10 is a schematic view showing a mode of oblique correction between discrimination block information (lower) and reference block information (upper) in the first embodiment of the present invention.

FIGS. 9 and 10 show a mode of correction, in the above-described configuration, on interpolation information for image information having a slope in an oblique direction.

FIG. 9 shows a case where blocks with matching pixel information are detected in the discrimination block information (upper) outputted from the discrimination block generator 111502 and the plural reference block information (lower) outputted from the reference block generator 111501.

In the case shown in FIG. 9, reference block information (lower) having same pixel information as in the discrimination block information (upper) is detected in the reference block information positioned in L4 to L7. In such case, the priority encoder (1) 111505 outputs, as position information, a distance from the discrimination block to L4 of a smallest distance, namely a value "4". On the other hand, as the block matching detector (2) 111504 does not detect matching blocks, the priority encoder (2) 111506 outputs a value "F" as the position information. Then the large/small discriminator 111507 compares the output values of the priority encoder (1) 111505 and the priority encoder (2) 111506 and selects and outputs a smaller value "4" and also outputs block matching detection information (upper) "1", while the position information counter 111510 loads a counter value "4". Also the correction condition detector 1115 outputs a value "2", which is a half of the output value "4" from the large/small discriminator 111507, as the correction position information to the interpolation information memory 1113. The correction condition detector 1115 constitutes pixel position specifying means of the present invention.

Since the block matching detection information (upper) is "1", the selector 111508 outputs, as the correction data, pixel information positioned on the lines C and E, among the pixel information of the discrimination block information (upper).

In this configuration, correction data for 2 pixels are generated for single discrimination block information and are simultaneously processed, whereby following effects can be obtained.

In order to correct the stepwise image information, formed in an unsmooth shape by the prior IP conversion method as shown in FIG. 31, into the image information of an original smooth form, it is necessary to correct, among the interpolation information present on an edge portion (namely interpolation information at $b_{n+5}$, $b_{n+6}$, $b_{n+7}$, $b_{n+8}$ on the line b and those at $d_{n+1}$, $d_{n+2}$, $d_{n+3}$, $d_{n+4}$ on the line d), a left half with white pixel information and a right half with black pixel information. In case of generating correction data for one pixel in the single discrimination block information, there can be processed either one only of the left half and the right half. By generating the correction data for two pixels in the single discrimination block information, it is possible to execute the correction on the left half and the right half.

Now, again referring to the correction process shown in FIG. 9, the discrimination block generator 111502 outputs the edge detection information "1", so that the AND element 111512 outputs an edge correction enable signal "1".

In the interpolation information memory 1113, based on the correction position information outputted from the correction condition detector 1115, it is discriminated that the interpolation information at a position L2 is to be corrected, and, based on the block matching detection information (upper) "1", it is discriminated that the interpolation information positioned on lines d and f are to be corrected, and in case the interpolation pixels on the lines d and f at L2 are moving images, the interpolation information on such positions are rewritten with the correction data outputted from the correction condition detector 1115.

Thus the correction process utilizing the pixel information at L0 as the discrimination block information is completed, and then a similar process is repeated utilizing the pixel information at L1 as the discrimination block information, but, since the position information counter 111510 memorizes the position information "4", results of matching detection with the reference block information (lower) from L2 to L4 are disregarded and the matching detection is executed with the reference block information (lower) at L5 and thereafter. Thus, when the discrimination block information is renewed to a next block, it is rendered possible to avoid that same reference block information (lower) as that processed in the previous discrimination block information is repeatedly selected and processed. (In practice, since the pixel information is shifted by the reference block generator 111501 and the reference block generator 111502, the discrimination block information (upper) at L1 is processed as the discrimination block information (upper) at L0, and the reference block information (lower) from L2 to L4 are processed as the reference block information (lower) from L1 to L3.)

Also, in the present embodiment, the correction data are generated from the discrimination block information, but the correction data may also be generated from the discrimination block information and the reference block information (lower) selected by the priority encoder (1) 111505. More specifically, it is also possible to adopt an average value of the pixel information at L0 on the line C and the pixel information at L4 on the line E as the correction data for the interpolation pixel at L2 on the line d, and to adopt an average value of the pixel information at L0 on the line E and the pixel information at L4 on the line G as the correction data for the interpolation pixel at L2 on the line f.

FIG. 10 shows a case where blocks with matching pixel information are detected in the discrimination block information (lower) outputted from the discrimination block generator 111502 and the plural reference block information (upper) outputted from the reference block generator 111501.

In the case shown in FIG. 10, reference block information (upper) having same pixel information as in the discrimination block information (lower) is detected in the reference block information positioned in L4 to L7. In this case, the priority encoder (2) 111506 outputs, as position information, a distance from the discrimination block to L4 of a smallest distance, namely a value "4". On the other hand, as the block matching detector (1) 111503 does not detect matching blocks, the priority encoder (1) 111505 outputs a value "F" as the position information. Then the large/small discriminator 111507 compares the output values of the priority encoder (1) 111505 and the priority encoder (2) 111506 and selects and outputs a smaller value "4" and also outputs block matching detection information (lower) "1", while the position information counter 111510 loads a counter value "4". Also the correction condition detector 1115 outputs a value "2", which is a half of the output value "4" from the large/small discriminator 111507, as the correction position information to the interpolation information memory 1113.

Since the block matching detection information (lower) is "1", the selector 111508 outputs, as the correction data, pixel information positioned on the lines C and E, among the pixel information of the discrimination block information (lower) Also the discrimination block generator 111502 outputs the edge detection information "1", so that the AND element 111512 outputs an edge correction enable signal "1".

In the interpolation information memory 1113, based on the correction position information outputted from the correction condition detector 1115, it is discriminated that the interpolation information at a position L2 is to be corrected, and, based on the block matching detection information (lower) "1", it is discriminated that the interpolation information positioned on lines b and d are to be corrected, and in case the interpolation pixels on the lines b and d at L2 are moving images, the interpolation information on such positions are rewritten with the correction data outputted from the correction condition detector 1115.

(Generation Process of Interpolation Information)

Figure 11:
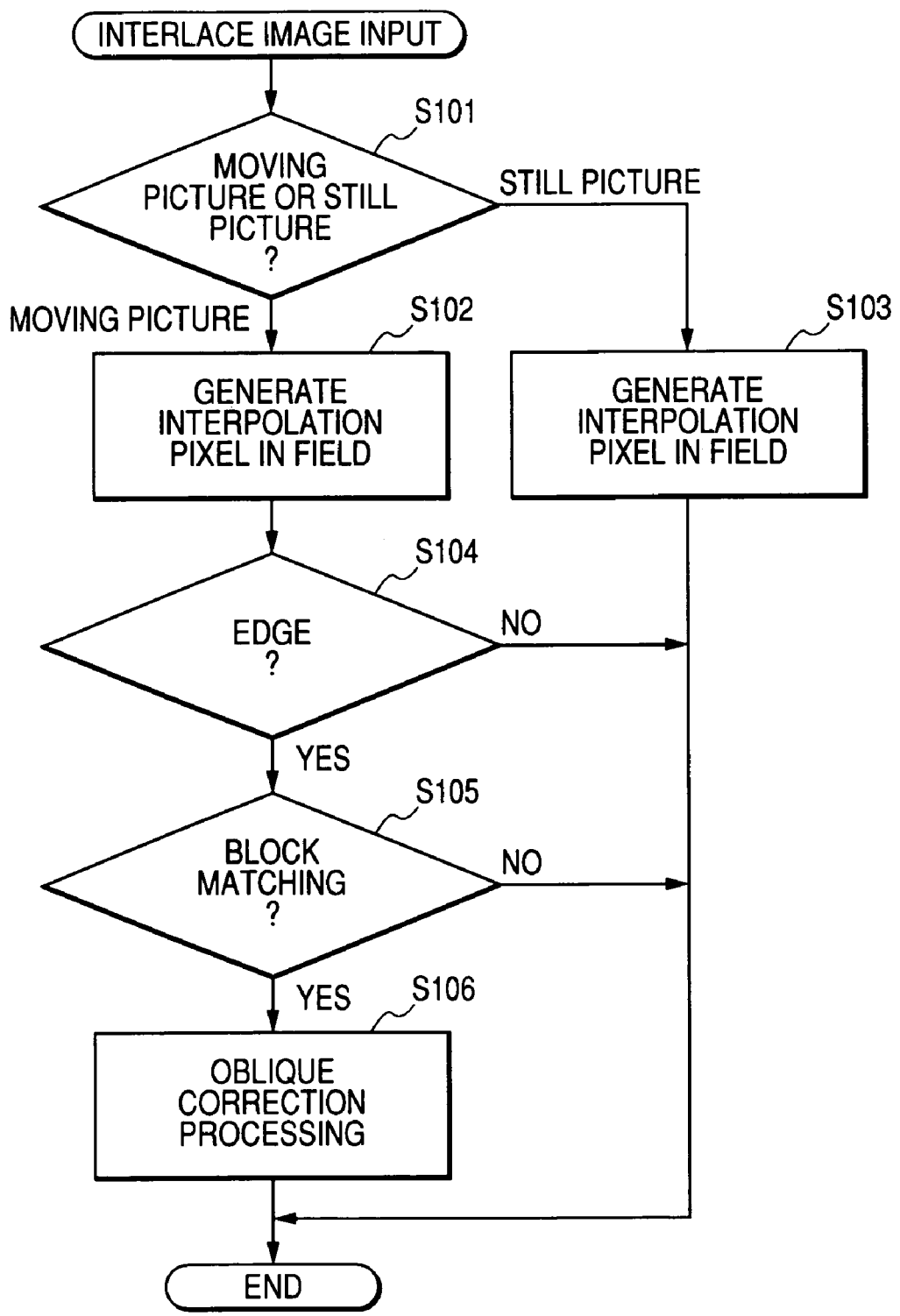
FIG. 11 is a flow chart showing a flow of an oblique correction process in the first embodiment of the present invention.

A process flow for generating the interpolation information by the IP conversion process circuit embodying the present invention as shown in FIG. 1 is shown in FIG. 11.

At first, as in the prior IP conversion process circuit, the movement information generator 103 determines movement information at the interpolation pixel from the interfield difference information (S101), and, the interpolation information is generated from the pixel information within the field in case of a moving image (S102), or the interpolation information is generated from the pixel information in the preceding field in case of a still image (S103). Then, in case the movement information at the interpolation pixel is a moving image, there is executed a correction process in the oblique correction processing unit 111. At first, among the pixel information of 4 lines inputted into the discrimination block generator 111502, there is discriminated whether an edge portion is present between the pixels of the 2nd line and the 3rd line (S104), and, in the presence of an edge portion, there is discriminated whether matching blocks are detected in the block matching detector (1) 111503 and the block matching detector (2) 111504 (S105), and in case of a detection of matching blocks, a pixel position for correction process and correction data are generated, and an oblique correction process is executed on the interpolation information determined in S102 (S106).

(Result of Interpolation Process)

Figure 12:
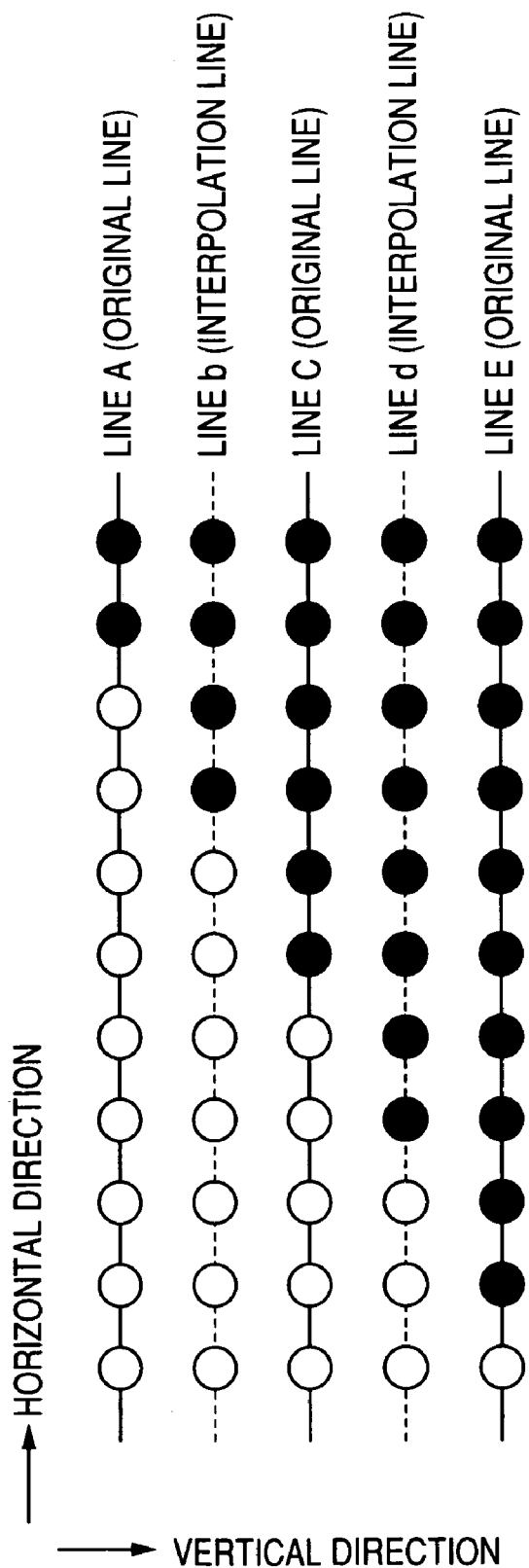
FIG. 12 is a schematic view showing a mode of an oblique correction process on an image having an edge portion in the first embodiment of the present invention.
Figure 13:
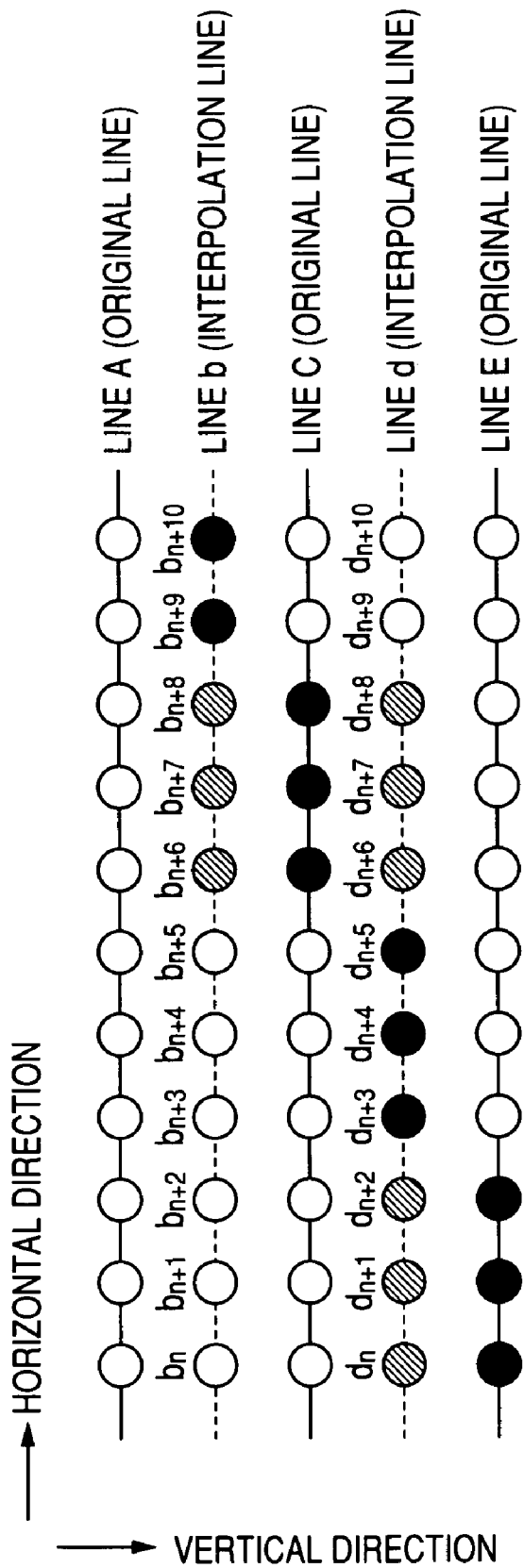
FIG. 13 is a schematic view showing a mode of an oblique correction process on a line segment image in the first embodiment of the present invention.

FIGS. 12 and 13 show a result of an interpolation process as a moving image on image information having a slope in the oblique direction, by the IP conversion process circuit embodying the present invention as shown in FIG. 1.

FIG. 12 shows a mode of the interpolation process by the present embodiment, on the image information having a slope in an oblique direction as shown in FIG. 30. As will be apparent from FIG. 12, the present embodiment enables a display retaining the smoothness in the sloped portion in the oblique direction. Also FIG. 13 shows a mode of the interpolation process by the present embodiment, on the image information of an oblique line of a line width corresponding to a pixel. As will be apparent from FIG. 13, in contrast to the prior IP conversion process circuit which displays an oblique line having pixel values continuously as a broken line, the present embodiment enables to display the lacking information of the oblique line (interpolation information at $d_{n+3}$, $d_{n+4}$, $d_{n+5}$, $d_{n+6}$) as the original continuous oblique line.

The present embodiment has been explained by an example, in case of inputting image information by an interlaced scanning and converting it into image information by a progressive scanning, of generating pixel information of interpolation pixels in consideration of an oblique edge based on the pixel information within the field. On the other hand, the present invention is applicable to any conversion of resolution (particularly a conversion for increasing the resolution). In such case the interpolation pixel is not necessarily positioned at the intermediate position of the discrimination block and the reference block. Naturally the present invention can generate the pixel information of a pixel in an arbitrary position between a discrimination block and a reference block, which are discriminated as similar, utilizing the pixel information of pixels constituting such discrimination block or the pixel information of pixels constituting such reference block. However, there is preferred a configuration of determining pixel information of:

(1) a pixel in an intermediate position between a predetermined pixel among the pixels constituting the discrimination block and a pixel among the pixels constituting the reference block, corresponding to the aforementioned predetermined pixel in the discrimination block (namely a pixel among the pixels constituting the referenced block, utilized for discriminating similarity to the aforementioned predetermined pixel); or (2) a pixel in a position close (particularly preferably closest) to the intermediate position (such configuration being effective in case an interpolation pixel is absent in the intermediate position);

1 based on the pixel information of the aforementioned pixel and/or the pixel information of the aforementioned corresponding pixel. Thus the present invention is applicable, not only to the IP conversion, but also to a non-interlaced signal (including a progressive operation signal and an IP-converted signal). It is therefore applicable not only to a television signal but also to image information or print information processed in a computer.

Also there has been explained a configuration for generating information of an interpolation pixel by the structures and steps explained detailedly in the foregoing in case of forming an image with a large movement (with a movement), but it is applicable also in case of forming an image with a small movement (including a case without movement).

Second Embodiment

In the first embodiment, there has been explained means of generating a discrimination block constituted of pixels in plural lines inputted by the interlaced scanning method within a field containing a pixel to be corrected and serving as a base of a correction process, also generating plural sets of a reference block which are inputted later than the discrimination block and which are displaced upwards or downwards by a line, then executing a comparison of pixel information between the discrimination block and each of the plural reference blocks, and, in case of detecting a matching, executing a correction of the pixel information in an interpolation pixel positioned between the discrimination block and a reference block on which the matching is detected. Also there has been explained means of generating correction data on two pixels for single discrimination block information and executing processes at the same time, thereby replacing the originally required two correction processes with only one correction process for image information having a slope in an oblique direction or image information of an oblique line of a line width corresponding to one pixel. As a result, for the image information having a slope in an oblique direction as shown in FIG. 30 there can be obtained satisfactory interpolated information as shown in FIG. 12, and, for image information of an oblique line of a line width corresponding to one pixel shown in FIG. 32, it is made possible, as shown in FIG. 13, to avoid a situation where the oblique line continuously having pixel values is displayed as a broken line.

However, in the result of interpolation shown in FIG. 13 by the first embodiment on the image information of an oblique line of a line width corresponding to one pixel, the result of interpolation by the prior IP conversion process remains in the interpolation pixels $d_n$, $d_{n+1}$, $d_{n+2}$, $d_{n+6}$, $d_{n+7}$, $d_{n+8}$, $b_{n+6}$, $b_{n+7}$ and $b_{n+8}$, so that the image information of the oblique line having an original line width of a pixel is displayed in these portions as an oblique line having a width of 3 pixels thus being displayed as an unsmooth stepwise oblique line.

Such result of interpolation can be improved by a certain improvement on the oblique correction process shown in the first embodiment. More specifically, in the first embodiment, each of the discrimination block serving as the base of the correction process, and the plural reference blocks which are inputted later than the discrimination block and which are displaced upwards or downwards by a line is formed by pixel information of 3 pixels (3 lines) in the vertical direction and pixel information 1 pixel in the horizontal direction, but by forming such blocks with pixel information of plural pixels in the horizontal direction, it is rendered possible to correct the interpolation information provided in the interpolation pixels above and below the oblique line, generated in the prior IP conversion process.

For this purpose, the present embodiment executes, for image information having a slope in an oblique direction, a correction process shown in the first embodiment, and is further provided with means which discriminates whether the input image information is an oblique line of a line width corresponding to a pixel, and, in case the input image information by an interlaced scanning method is discriminated as image information of an oblique line having a line width corresponding to a pixel, a correction process is executed, in addition to the correction process for the image information having a slope in an oblique direction, with a discrimination block and plural reference blocks having pixel information of plural pixels also in the horizontal direction.

In the present embodiment, the entire configuration of the IP conversion process circuit is same as that of the first embodiment shown in FIG. 1.

(Structure of Oblique Correction Processor)

Figure 14:
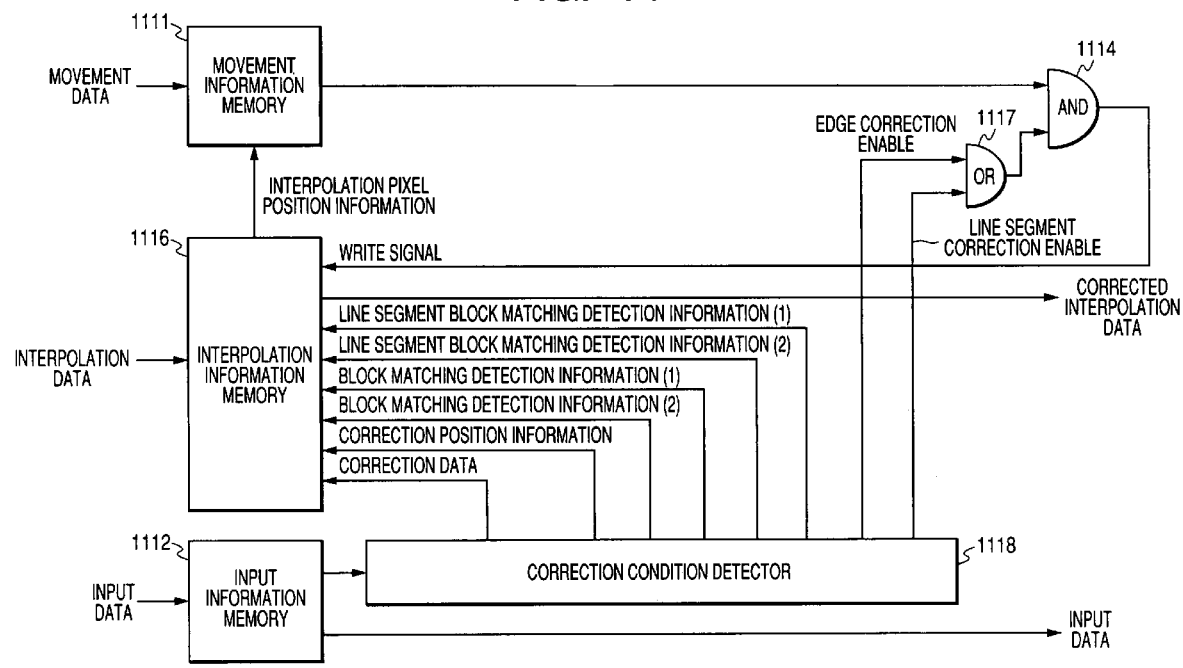
FIG. 14 is a block diagram showing a configuration of an oblique correction processing unit in a second embodiment of the present invention.

FIG. 14 is a block diagram showing an example of the oblique correction processor 111 in the present embodiment.

Referring to FIG. 14, a movement information memory 1111, an input information memory 1112 and an AND element 1114 are same as those explained in the first embodiment. An interpolation information memory 1116 is capable of storing plural lines of the interpolation information outputted from the interpolation information selector 109, and is rendered capable of a correction process for image information having a slope in an oblique direction as explained in the first embodiment and also a correction process in case the input image information by an interlaced scanning method is image information of an oblique line of a line width corresponding to a pixel. An OR element 1117 determines a logic sum of two input signals. A correction condition detector 1118 executes, in addition to the matching/unmatching discrimination of the pixel information in a unit of a block constituted of plural pixels in the vertical direction as explained in the first embodiment, a discrimination whether the input image information by an interlaced scanning method is image information of an oblique line of a line width corresponding to a pixel, and, in case it is image information of an oblique line of a line width corresponding to a pixel, a matching/unmatching discrimination of the pixel information in a unit of a block having pixel information of plural pixels also in the horizontal direction.

The mode of the processing in the oblique correction processor 111 of the present embodiment will be detailedly explained in the following.

(Entire Structure of Correction Condition Detector)

Figure 15:
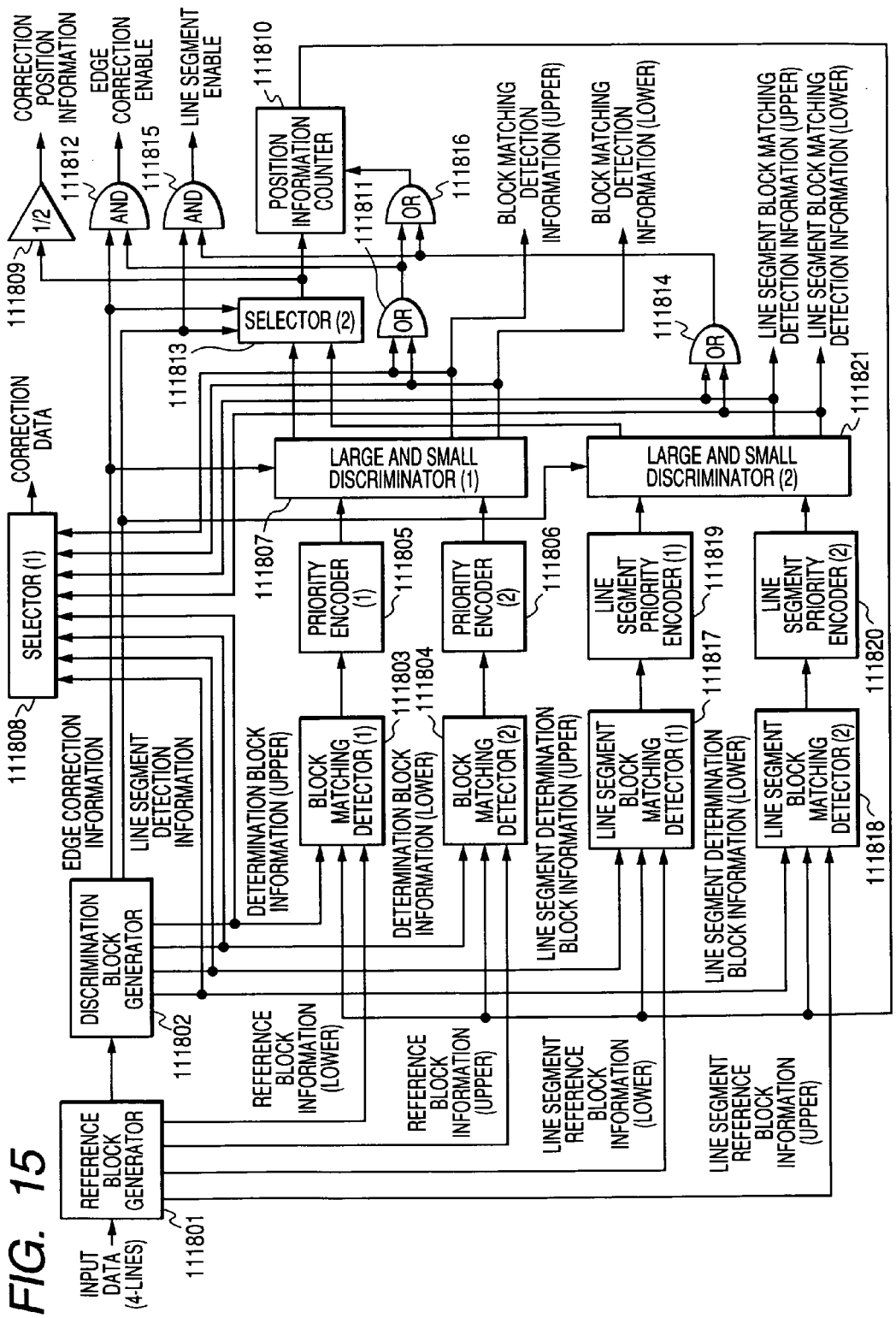
FIG. 15 is a block diagram showing a configuration of a correction condition detector in a second embodiment of the present invention.

FIG. 15 is a block diagram showing a configuration of the correction condition detector 1118 in the present embodiment.

Referring to FIG. 15, a reference block generator 111801 generates plural sets of reference block information segment reference block information constituted of plural pixels, for discriminating matching/unmatching of discrimination block information and segment discrimination block information to be explained later and pixel information. A discrimination block generator 111802 generates discrimination block information and segment discrimination block information serving as a base for discriminating matching/unmatching of plural sets of reference block information and segment reference block information outputted from the reference block generator 111801 and the pixel information. Block matching detectors 111803, 111804 execute a matching/unmatching discrimination between the discrimination block information outputted from the discrimination block generator 111802 and each of the plural sets of reference block information outputted from the reference block generator 111801, and output a result for each reference block information. Segment block matching detectors 111817, 111818 execute a matching/unmatching discrimination between the segment discrimination block information outputted from the discrimination block generator 111802 and each of the plural sets of segment reference block information outputted from the reference block generator 111801, and output a result for each segment reference block information. Priority encoders 111805, 111806 output position information of a block for which a matching is detected for the first time, based on the result of matching/unmatching discrimination for each reference block information, outputted from the block matching detector (1) 111803 and the block matching detector (2) 111804. Segment priority encoders 111819, 111820 output position information of a block for which a matching is detected for the first time, based on the result of matching/unmatching discrimination for each segment reference block information, outputted from the segment block matching detector (1) 111817 and the segment block matching detector (2) 111818. A large/small discriminator (1) 111807 selects and outputs position information of a smaller value, among the position information outputted from the priority encoder (1) 111805 and the priority encoder (2) 111806. A large/small discriminator (2) 111821 selects and outputs position information of a smaller value, among the position information outputted from the segment priority encoder (1) 111819 and the segment priority encoder (2) 111820. A selector (1) 111808 selects and outputs discrimination block information or segment discrimination block information outputted from the discrimination block generator 111802, according to block matching detection information (upper), block matching detection information (lower), segment block matching detection information (upper), and segment block matching detection information (lower) outputted from the large/smaller discriminator (1) 111807 and the large/smaller discriminator (2) 111821. A selector (2) 111813 selects and outputs either of the output values from the large/smaller discriminator (1) 111807 and the large/smaller discriminator (2) 111821, according to edge detection information and segment detection information outputted from the discrimination block generator 111802. A divider 111809 determines a half of the position information selected and outputted by the selector (2) 111813. A position information counter 111810 stores the position information selected and outputted by the selector (2) 111813 and executes a count-down operation. OR elements 111811, 111814 and 111816 each determines a logic sum of two input signals. AND elements 111812 and 111815 each determines a logic product of two input signals.

(Function of Correction Condition Detector)

In the following, there will be explained a function of the correction condition detector 1118 of the present embodiment, having the above-described structure.

(Reference Block Generator)

The reference block generator 111801 is principally constituted, as in the reference block generator 111501 in the first embodiment, of memory elements such as flip-flops, for storing the input image information of 4 lines, outputted from the input information memory 1112, by plural pixels for each line. The reference block generator 111801 and the discrimination block generator 111802 constitute specifying means of the present invention.

Figure 16:
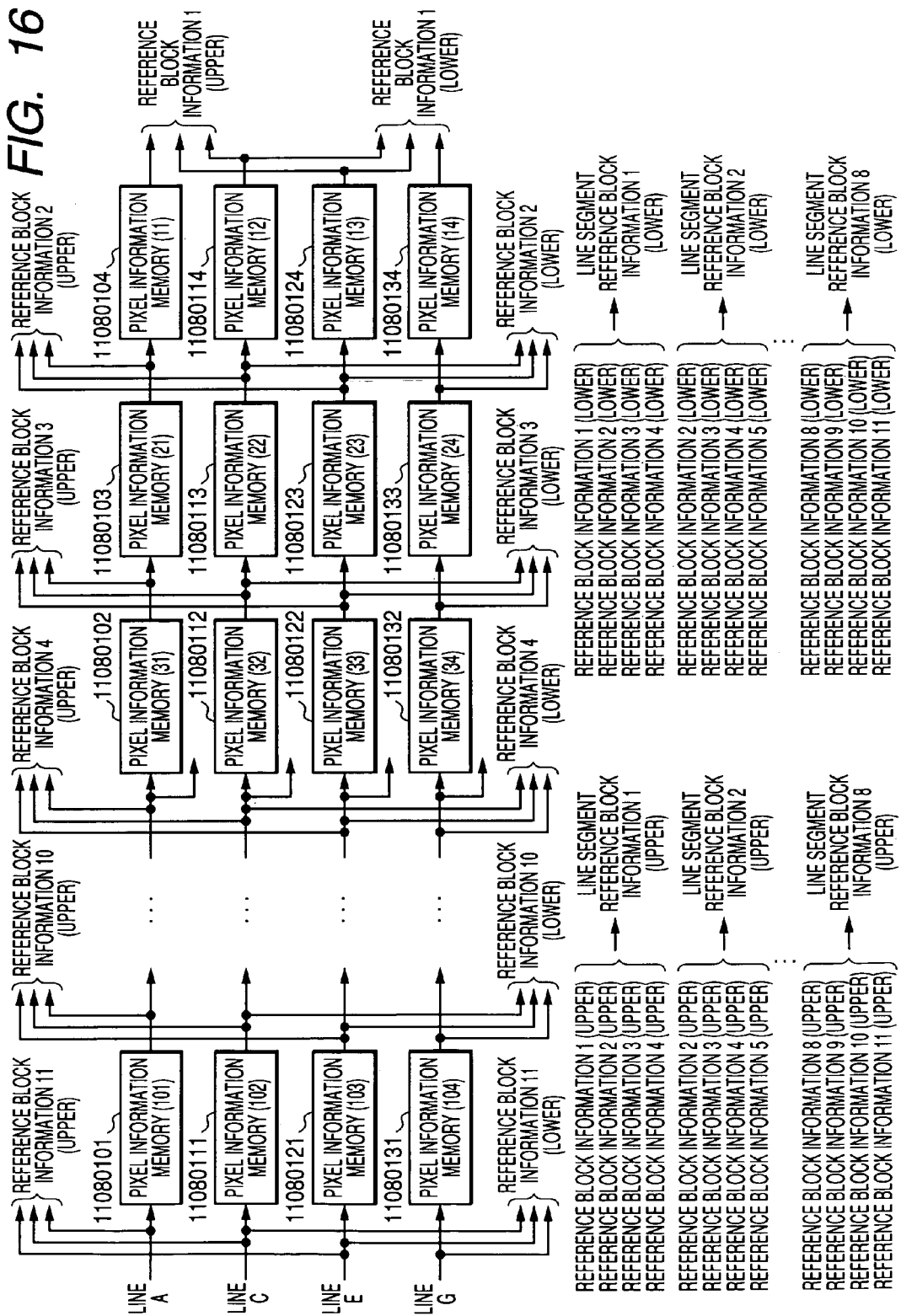
FIG. 16 is a block diagram showing a configuration of a reference block generator in a second embodiment of the present invention.

FIG. 16 is a block diagram showing a configuration of the reference block generator 111801 in the present embodiment.

Figure 20:
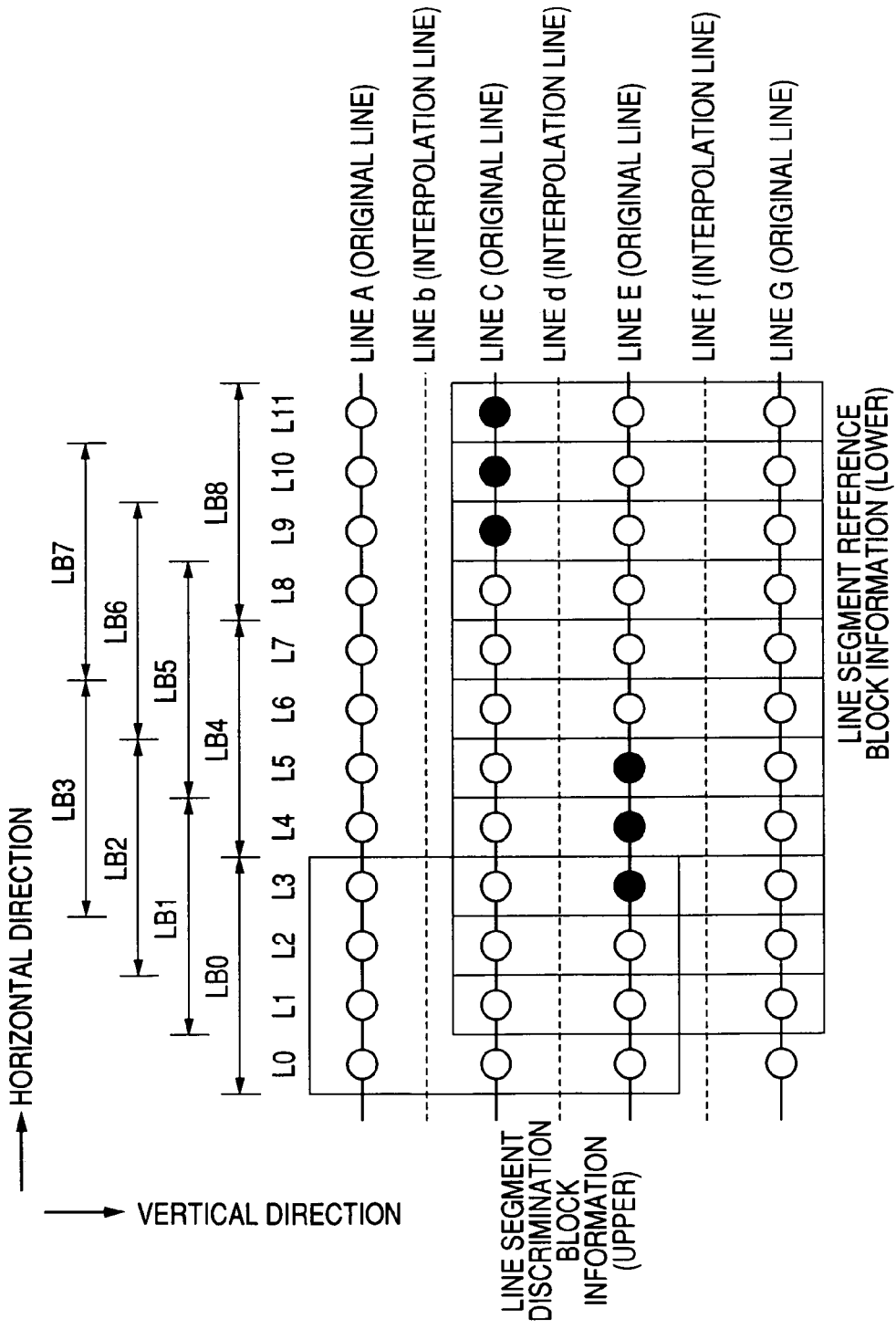
FIG. 20 is a schematic view showing a mode of matching detection between segment discrimination block information (upper) and segment reference block information (lower) in the second embodiment of the present invention.
Figure 21:
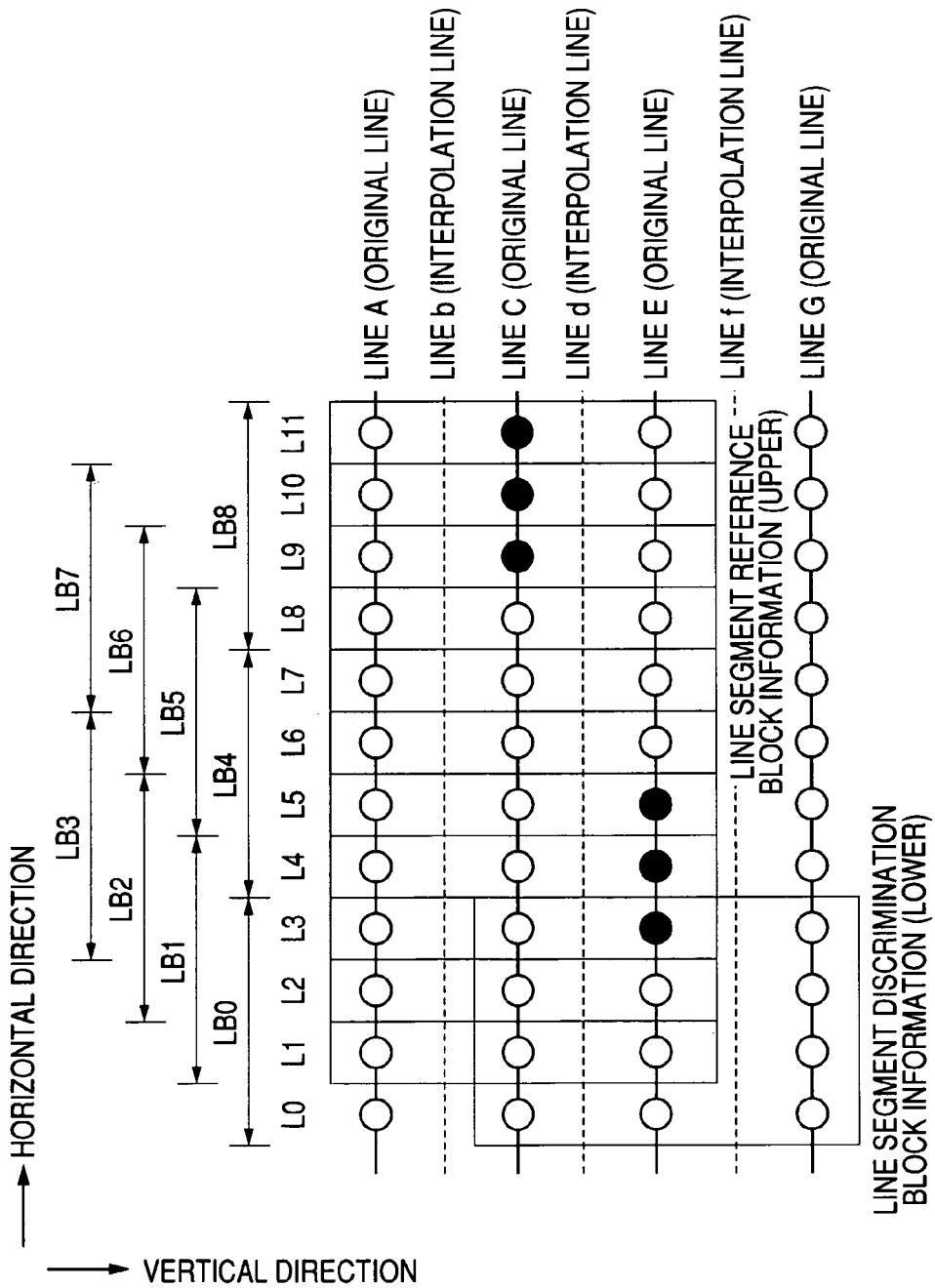
FIG. 21 is a schematic view showing a mode of matching detection between segment discrimination block information (lower) and segment reference block information (upper) in the second embodiment of the present invention.

Referring to FIG. 16, pixel information memories 11180101-11180104, 11180111-111850114, 11180121-11180124 and 11180131-11180134 store the input image information. The image information stored in the pixel information memories are shifted in succession to the succeeding image information memories at each output timing of the image information from the input information memory 1112. A number of the pixel information memories per a line is variable by a distance of a reference block to be referred to by a number of pixels from the position of the block to be discriminated. In the present embodiment, as in the reference block generator 111501 of the first embodiment, in order to generate reference block information positioned from L1 to L11, 10 pixel information memories are provided for each line. The reference block generator 111801, as in the reference block generator 111501 of the first embodiment, generates and outputs reference block information (upper) and reference block information (lower) constituted of pixel information of 3 lines among the input image information and the image information stored in the pixel information memories, but the reference block generator 111801, as shown in FIGS. 20 and 21, also outputs segment reference block information (upper) and segment reference block information (lower) having pixel information of 4 pixels in the horizontal direction and respectively corresponding to reference positions from LB1 to LB8. In the present embodiment, the segment reference block information is generated with pixel information of 4 pixels in the horizontal direction, but the present invention is not limited to such 4 pixels but may have pixel information of any plural number in the horizontal direction for attaining the effect of the present embodiment.

Again referring to FIG. 16, the image information inputted to a pixel information memory (31) 11180102, a pixel information memory (32) 11180112, a pixel information memory (33) 11180122, and a pixel information memory (34) 11180132 are outputted to the discrimination block generator 111802 provided in a stage subsequent to the reference block generator 111801.

(Discrimination Block Generator)

Again referring to FIG. 15, the discrimination block generator 111802 generates discrimination block information and segment discrimination block information as a base for discriminating matching/unmatching of the pixel information from the image information outputted from the reference block generator 111801, then judges whether an edge portion or a segment is present in the discrimination block information and outputs a result as edge detection information and segment detection information. The discrimination block generator 111802 constitutes edge detection means of the present invention.

Figure 17:
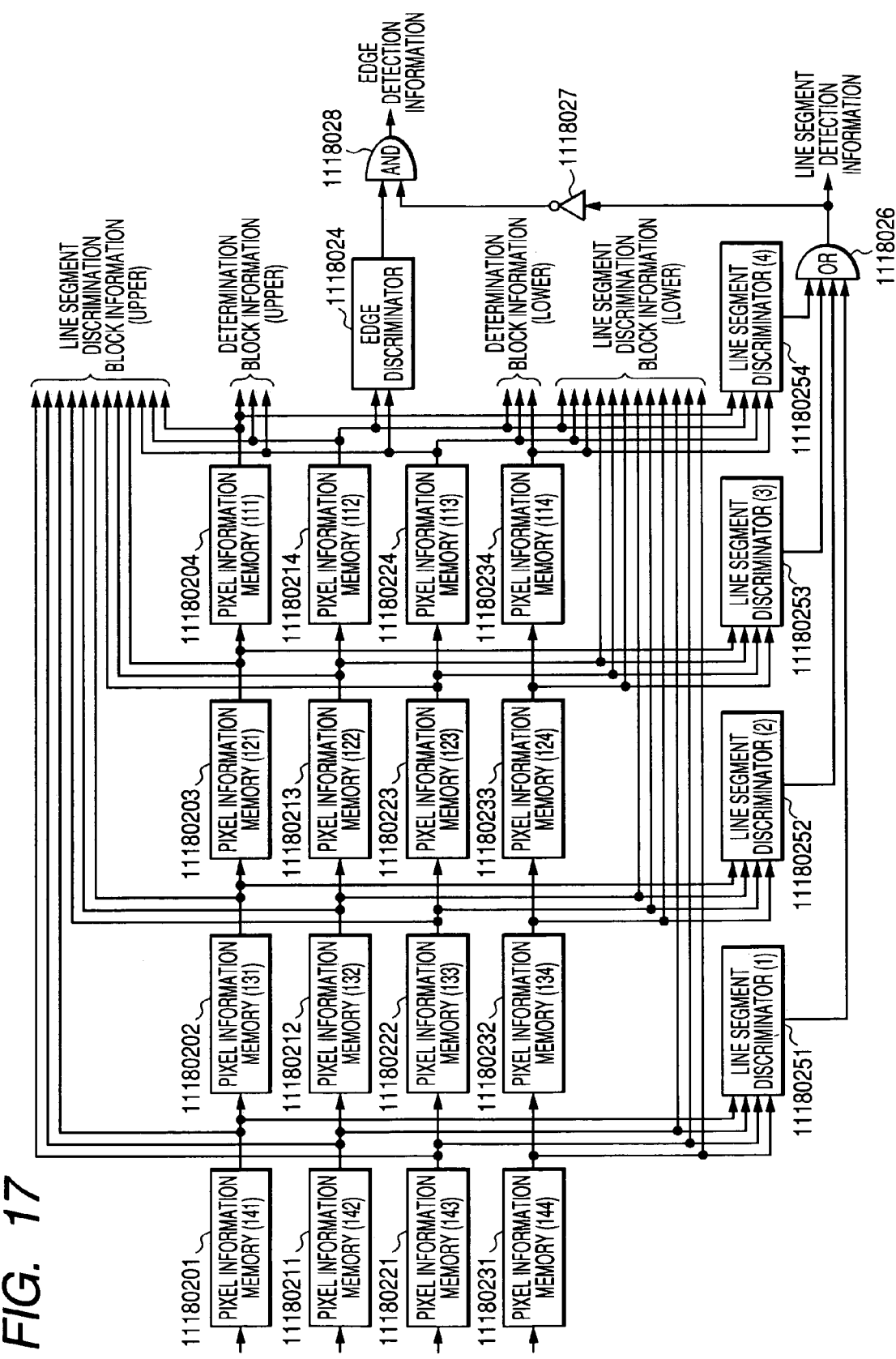
FIG. 17 is a block diagram showing a configuration of a discrimination block generator in a second embodiment of the present invention.

FIG. 17 is a block diagram showing a configuration of the discrimination block generator 111802.

Referring to FIG. 17, pixel information memories 11180201-11180204, 11180211-111850214, 11180221-11180224 and 11180231-11180234 store the input image information. The image information stored in the pixel information memories are shifted in succession to the succeeding image information memories at each output timing of the image information from the reference block generator 111801. The discrimination block generator 111802, as in the discrimination block generator 111502 of the first embodiment, generates and outputs reference block information (upper) and reference block information (lower) constituted of pixel information of 3 lines from the input image information stored in the pixel information memories. In the present embodiment, the discrimination block generator 111802, as shown in FIGS. 20 and 21, also outputs segment discrimination block information (upper) and segment discrimination block information (lower) having pixel information of 4 pixels in the horizontal direction. In the present embodiment, the segment discrimination block information is generated with pixel information of 4 pixels in the horizontal direction, but, as in the segment reference block information, the present invention is not limited to such 4 pixels but may have pixel information of any plural pixels in the horizontal direction for attaining the effect of the present embodiment.

(Edge Discriminator and Segment Discriminator)

Again referring to FIG. 17, an edge discriminator 1118024 discriminates whether an edge portion is present between pixels, based on inputted interpixel difference information of 2 pixels. Segment discriminators 11180251-11180254 discriminate whether a segment is present based on inputted pixel information of 4 pixels.

Figure 19:
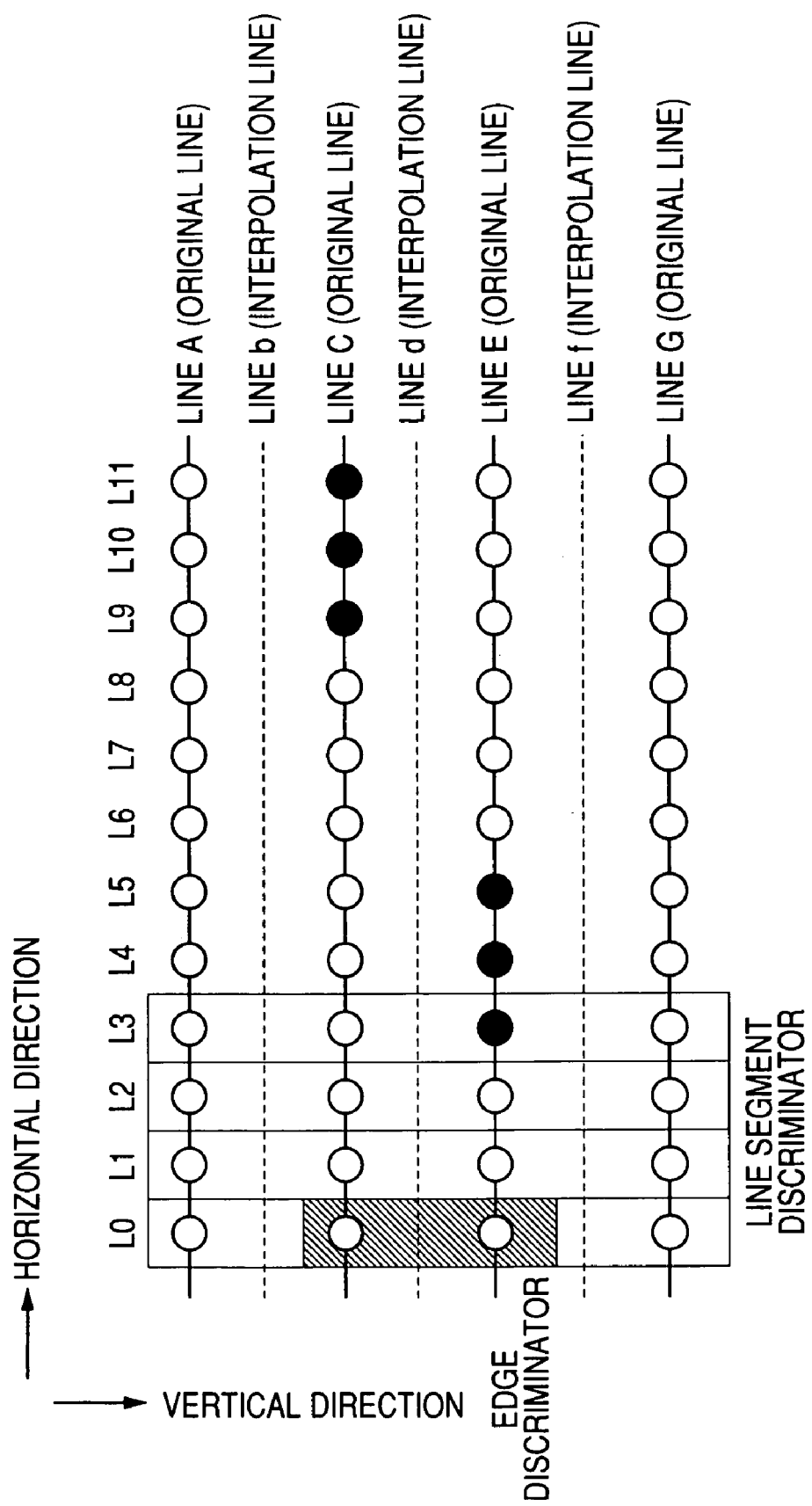
FIG. 19 is a schematic view showing a mode of detection of edge information and segment information in the second embodiment of the present invention.

FIG. 19 shows a mode of an edge discrimination and a segment discrimination by the edge discriminator 1118024 and the segment discriminators (1) 11180251, (2) 11180252, (3) 11180253 and (4) 11180254.

The pixel information memories (111) 11180204, (112) 11180214, (113) 11180224 and (114) 11180234 output pixel information of 4 lines positioned at L0. The pixel information memories (121) 11180203, (122) 11180213, (123) 11180223 and (124) 11180233 output pixel information of 4 lines positioned at L1. The pixel information memories (131) 11180202, (132) 11180212, (133) 11180222 and (134) 11180232 output pixel information of 4 lines positioned at L2. The pixel information memories (141) 11180201, (142) 11180211, (143) 11180221 and (144) 11180231 output pixel information of 4 lines positioned at L3.

The edge discriminator 1118024 receives pixel information of the lines C and E at L0, outputted from the pixel information memories (112) 11180214 and (113) 11180224, then discriminates whether an edge portion is present between the pixels by difference information of such pixels, and outputs a result of such discrimination. Also the segment discriminators (1) 11180251, (2) 11180252, (3) 11180253 and (4) 11180254 respectively receive 4-line pixel information respectively positioned at L3, L2, L1 and L0, then a segment is discriminated in case an edge portion is present between the pixels of the lines C and E and a difference is detected between the pixels of the lines A and C or between the pixels of the lines E and G in each segment discriminator, and such result of discrimination is outputted. The discrimination results outputted from the segment discriminators (1) 11180251, (2) 11180252, (3) 11180253 and (4) 11180254 are inputted to a 4-input OR element 1118026. In case a segment is detected in any of the segment discriminators (1) 11180251, (2) 11180252, (3) 11180253 and (4) 11180254, the 4-input OR element 1118026 outputs segment detection information "1". The segment detection information from the 4-input OR element 1118026 is simultaneously inputted into a NOT element 1118027 for inverting the polarity, and an AND element 1118028 determines a logic product of the discrimination result outputted from the edge discriminator 1118024 and the segment detection information of which polarity is inverted by the NOT element 1118027, and outputs it as edge detection information. Thus, in case a segment is detected in the blocks in the positions from L0 to L3 and the OR element 1118026 outputs the segment detection information "1", the discrimination result outputted from the edge discriminator 1118024 is disregarded and the edge detection information is always outputted as "0". On the other hand, in case a segment is not detected in the blocks in the positions from L0 to L3 and the OR element 1118026 outputs the segment detection information "0", the edge detection information follows the discrimination result outputted from the edge discriminator 1118024, and becomes "1" in case an edge portion is discriminated between the pixels between the lines C and E at L0 and becomes "0" in case an edge portion is discriminated as absent.

(Block Matching Detector and Segment Block Matching Detector)

Again referring to FIG. 15, the block matching detector (1) 111803 and the block matching detector (2) 111804 have configurations similar to the block matching detector (1) 111503 and the block matching detector (2) 111504. More specifically, the block matching detector (1) 111803 and the block matching detector (2) 111804 respectively execute a pixel-to-pixel comparison on the discrimination block information (upper) outputted from the discrimination block generator 111802 with the reference block information (lower)

positioned from L1 to L11, outputted from the reference block generator 111801, and on the discrimination block information (lower) outputted from the discrimination block generator 111802 with the reference block information (upper) positioned from L1 to Li1, outputted from the reference block generator 111801, and outputs a matching/unmatching result of discrimination for each reference block information. A segment block matching detector (1) 111817 executes a pixel-to-pixel comparison of the segment discrimination block information (upper) outputted from the discrimination block generator 111802 with each of the reference block information (lower) having pixel information of 4 pixels in the horizontal direction and positioned from LB1 to LB8, outputted from the reference block generator 111801, and outputs a matching/unmatching result of discrimination for each segment reference block information. The block matching detector (1) 111803, the block matching detector (2) 111804, the segment block matching detector (1) 111817 and the segment block matching detector (2) 111818 constitute discrimination means of the present invention.

(Structure of Segment Block Matching Detector)

Figure 18:
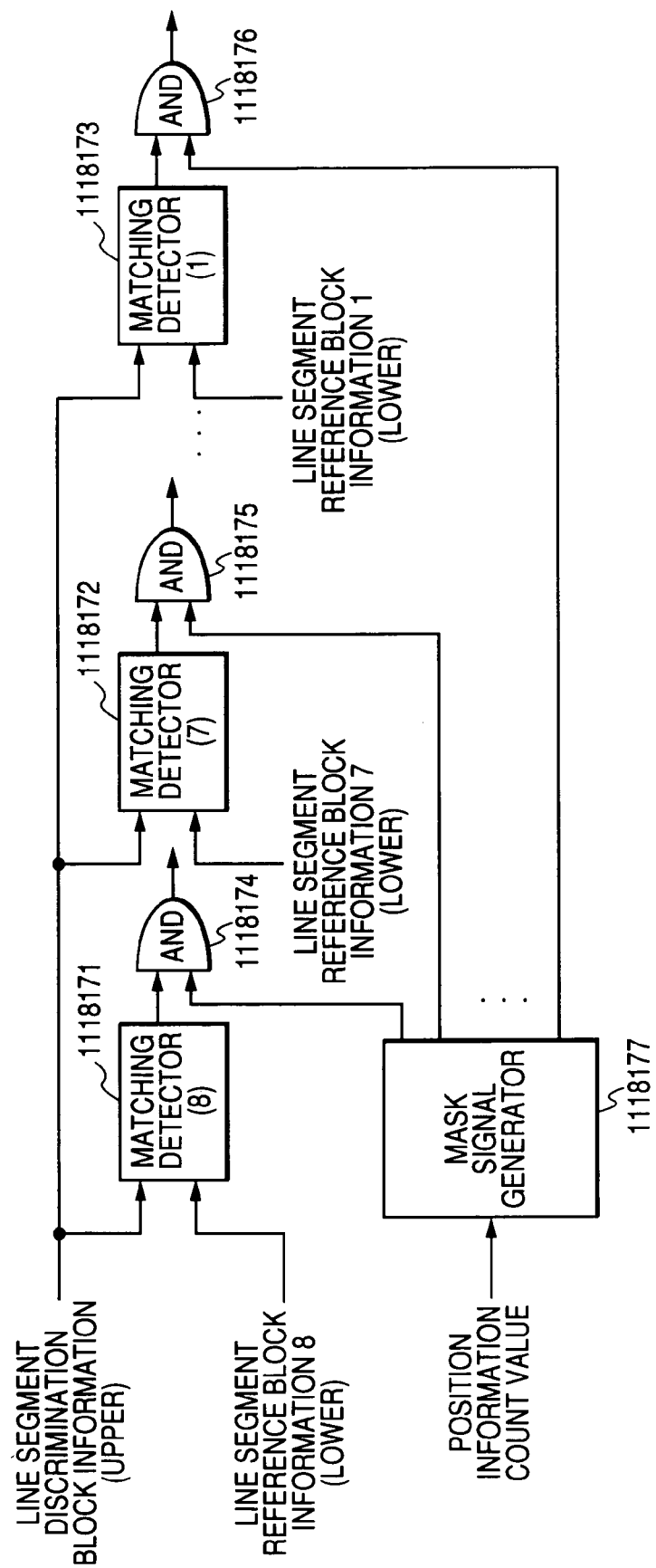
FIG. 18 is a block diagram showing a configuration of a segment block matching detector in a second embodiment of the present invention.

FIG. 18 is a block diagram showing a configuration of the segment block matching detector (1) 111817 in the present embodiment.

Referring to FIG. 18, matching detectors 1118171-1118173 execute a matching/unmatching discrimination by a pixel-to-pixel comparison of the segment discrimination block information (upper) outputted from the discrimination block generator 111802 and the segment reference block information (lower) outputted from the reference block generator 111801. In the present embodiment, as the reference block generator 111801 outputs the segment reference block information (lower) having pixel information of 4 pixels in the horizontal direction and positioned from LB1 to LB8 as shown in FIG. 20, the segment matching detector (1) 111817 is provided in 8 units respectively corresponding to the segment reference block information (lower). AND elements 1118174-1118176, each determining a logic product of two input signals, are respectively coupled with the matching detectors. A mask signal generator 1118177 decodes a count outputted from the position information counter 111810 and generates a mask signal for masking the result of discrimination outputted from the matching detector in response to the count of the position information counter 111810. The mask signal generator 1118177 regards the count outputted from the position information counter 111810 as indicating the position of the segment reference block information (lower), and outputs a mask signal to each matching detector so as to shift the matching/unmatching discrimination result in the segment reference block information (lower) of a position smaller than the count outputted from the position information counter 111810 forcedly to an unmatching result, thereby avoiding a situation that segment reference block information (lower), which is discriminated as matching in the past is referred to again when the segment discrimination block information (upper) outputted from the discrimination block generator 111802 is renewed to new information. The position information counter 111810 and the mask signal generator 1118177 constitute alteration means of the present invention, and the position information counter 111810 constitutes holding means of the present invention.

Again referring to FIG. 15, the segment block matching detector (2) 111818 executes a pixel-to-pixel comparison of the segment discrimination block information (lower) outputted from the discrimination block generator 111802 with each of the segment reference block information (upper) having pixel information of 4 pixels in the horizontal direction and positioned from LB1 to LB8, outputted from the segment reference block generator 111801, and outputs a matching/unmatching result of discrimination for each segment reference block information. The segment block matching detector (2) 111818 has a configuration same as that of the segment block matching detector (1) 111817 shown in FIG. 18. FIG. 21 shows a positional relationship between the segment discrimination block information (lower) and the segment reference block information (upper) processed in the segment block matching detector (2) 111818.

(Priority Encoder and Segment Priority Encoder)

A priority encoder (1) 111805 and a priority encoder (2) 111806, as in the priority encoder (1) 111505 and a priority encoder (2) 111506 in the first embodiment, respectively receive the matching/unmatching discrimination results outputted from the block matching detector (1) 111803 and the block matching detector (2) 111804, then detect, among the matching/unmatching discrimination results from L1 to L11, a matching discrimination result in reference block information of a smaller distance from the discrimination block, and outputs position information thereof. Also in the present embodiment, as in the first embodiment, a hexadecimal number "1" is outputted in case a matching is detected between the discrimination block information and the reference block information positioned at L1, also a hexadecimal number "B" is outputted in case a matching is detected between the discrimination block information and the reference block information positioned at L11, and a number "F" is outputted in case a matching is not detected. A segment priority encoder (1) 111819 and a segment priority encoder (2) 111820 respectively receive the matching/unmatching discrimination results outputted from the segment block matching detector (1) 111817 and the segment block matching detector (2) 111818, then detect, among the matching/unmatching discrimination results from LB1 to LB8, a matching discrimination result in reference block information of a smaller distance from the discrimination block, and outputs position information thereof. In the present embodiment, a hexadecimal number "1" is outputted in case a matching is detected between the segment discrimination block information and the segment reference block information positioned at LB1, also a hexadecimal number "8" is outputted in case a matching is detected between the segment discrimination block information and the segment reference block information positioned at LB8, and a number "F" is outputted in case a matching is not detected.

The large/small discriminator (1) 111807, as in the large/small discriminator 111507 in the first embodiment, compares the values outputted from the priority encoder (1) 111805 and the priority encoder (2) 111806, and selects and outputs a smaller one. At the same time, the selected output is reflected in block matching detection information (upper) or block matching detection information (lower). More specifically, in case a value outputted from the priority encoder (1) 111805 is selected, there are outputted block matching detection information (upper) as "1" and block matching detection information (lower) as "0". Also in case a value outputted from the priority encoder (2) 111806 is selected, there are outputted block matching detection information (upper) as "0" and block matching detection information (lower) as "1". Also in case a matching is not detected in any of the reference blocks and the large/small discriminator 111807 outputs a value "F", both the block matching detection information (upper) and the block matching detection information (lower) are outputted as "0". In case the block matching detector (1) 111803 or the block matching detector (2) 111804 detects a matching in any of the reference blocks to output "1" in any of the block matching detection information (upper) and the block matching detection information (lower), the OR element 111811 outputs "1".

(Large/Small Discriminator)

The large/small discriminator (2) 111821 compares the values outputted from the segment priority encoder (1) 111819 and the segment priority encoder (2) 111820, and selects and outputs a smaller one. At the same time, the selected output is reflected in segment block matching detection information (upper) or segment block matching detection information (lower). More specifically, in case a value outputted from the segment priority encoder (1) 111819 is selected, there are outputted segment block matching detection information (upper) as "1" and segment block matching detection information (lower) as "0". Also in case a value outputted from the priority encoder (2) 111820 is selected, there are outputted segment block matching detection information (upper) as "0" and segment block matching detection information (lower) as "1". Also in case a matching is not detected in any of the segment reference blocks and the large/small discriminator (2) 111821 outputs a value "F", both the segment block matching detection information (upper) and the segment block matching detection information (lower) are outputted as "0". In case the segment block matching detector (1) 111817 or the segment block matching detector (2) 111818 detects a matching in any of the reference blocks to output "1" in any of the segment block matching detection information (upper) and the segment block matching detection information (lower), the OR element 111814 outputs "1".

(Selector (2))

The selector (2) 111813 selects either of the value outputted from the large/small discriminator (1) 111807 and the value outputted from the large/small discriminator (2) 111821 according to the edge detection information and the segment detection information outputted from the discrimination block generator 111802, and outputs it as correction data. More specifically, in case the edge detection information or the segment detection information is outputted as "1", the value outputted from the large/small discriminator (1) 111807 or the value outputted from the large/small discriminator (2) 111821 is respectively selected. In case the edge detection information and the segment detection information are both "0", either of the value outputted from the large/small discriminator (1) 111807 or the value outputted from the large/small discriminator (2) 111821 may be selected and the function of the oblique correction processor 111 is not influenced by such selection. The output value from the selector (2) 111813 is halved by the divider 111809, and outputted as correction position information. An OR element 111816 outputs a logic sum of the OR elements 111811 and 111814, thus outputting "1" in case a block matching is detected in any of the block matching detector (1) 111803, the block matching detector (2) 111804, the segment block matching detector (1) 111817 and the segment block matching detector (2) 111818.

(Position Information Counter)

The position information counter 111810 utilizes the signal outputted from the OR element 111816 as a load enable signal, and, in case of an output "1", fetches a value outputted from the selector (2) 111813 as a counter value. Also in case a matching is not detected in any of the reference blocks and a value "0" is outputted from the OR element 111816, it decreases the counter value by "1", and in case a value "0" is outputted from the OR element 111816 in a state of a counter value "0", it retains a counter value "0".

(Selector (1))

The selector (1) 111808 selects either of the discrimination block information (upper), the discrimination block information (lower), the segment discrimination block information (upper) and the segment discrimination block information (lower), outputted from the discrimination block generator 111802 and outputs it as correction data, according to the block matching detection information (upper) and the block matching detection information (lower) outputted from the large/small discriminator (1) 111807 and the segment block matching detection information (upper) and the segment block matching detection information (lower) outputted from the large/small discriminator (2) 111821. More specifically, in case the block matching information (upper) or the block matching information (lower) is "1", the discrimination block information (upper) or the discrimination block information (lower) is respectively selected as the correction data, and in case the segment block matching information (upper) or the segment block matching information (lower) is "1", the segment discrimination block information (upper) or the segment discrimination block information (lower) is respectively selected as the correction data. In case a matching is not detected in any of the reference blocks and the block matching information (upper), the block matching information (lower), the segment block matching information (upper) and the segment block matching information (lower) are all "0", any of the discrimination block information (upper), the discrimination block information (lower), the segment discrimination block information (upper) and the segment discrimination block information (lower) may be selected and the function of the oblique correction processor 111 is not influenced by such selection.

(Edge Correction Enable Signal and Segment Correction Enable Signal)

The AND element 111812 outputs an edge correction enable signal "1" in case the edge detection information outputted from the discrimination block generator 111802 and the output signal from the OR element 111811 are "1". More specifically, in case the discrimination block information outputted from the discrimination block generator 111802 includes edge information and a block with matching pixel information with the discrimination block information is detected among the plural reference block information outputted from the reference block generator 111801, an edge correction enable signal "1" is outputted indicating that conditions for executing an edge correction process in the correction condition detector 1118 become ready. Also the AND element 111815 outputs a segment correction enable signal "1" in case the segment detection information outputted from the discrimination block generator 111802 and the output signal from the OR element 111814 are "1". More specifically, in case the segment discrimination block information outputted from the discrimination block generator 111802 includes segment information and a block with matching pixel information with the segment discrimination block information is detected among the plural segment reference block information outputted from the reference block generator 111801, a segment correction enable signal "1" is outputted indicating that conditions for executing a segment correction process in the correction condition detector 1118 become ready.

(Correction Process in Interpolation Information Memory)

Again referring to FIG. 14 and in case an edge correction enable signal or a segment correction enable signal is outputted as "1" from the correction condition detector 1118 and the movement information in a pixel to be corrected, outputted from the movement information memory 1111, indicates a moving image, the AND element 1114 outputs a write signal "1" to the interpolation information memory 1116 for executing a correction process. When a write signal "1" is outputted from the AND element 1114, the interpolation information memory 1116 rewrites the interpolation information, in a position specified by the correction position information outputted from the correction condition detector 1118 and the block matching detection information (upper), the block matching detection information (lower), the segment block matching detection information (upper) and the block matching detection information (lower), with the correction data outputted from the correction condition detector 1118. The interpolation information memory 1116 constitutes correction means of the present invention.

(Correction Process for Interpolation Information)

Figure 22:
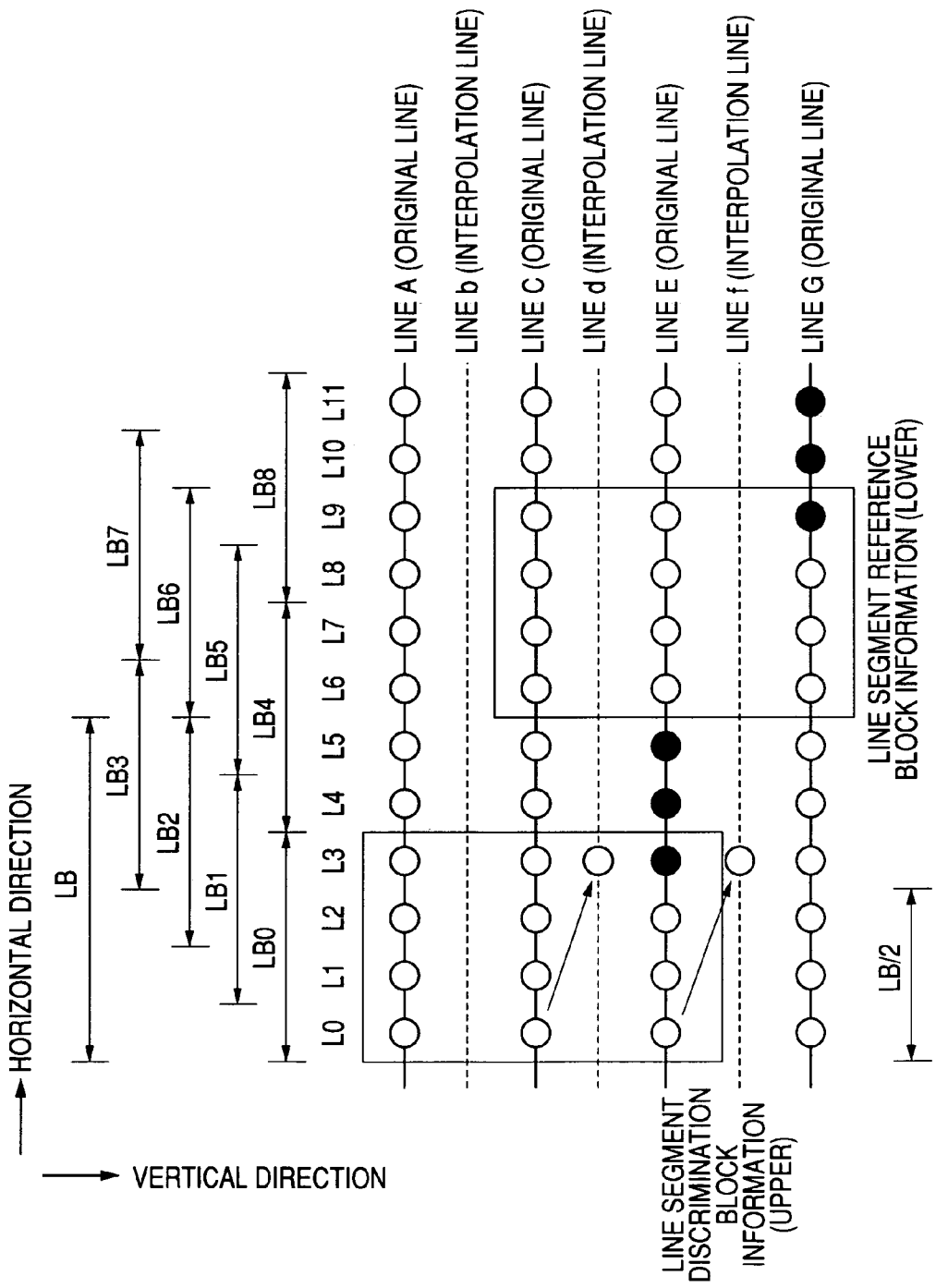
FIG. 22 is a schematic view showing a mode of oblique correction between segment discrimination block information (upper) and segment reference block information (lower) in the second embodiment of the present invention.
Figure 23:
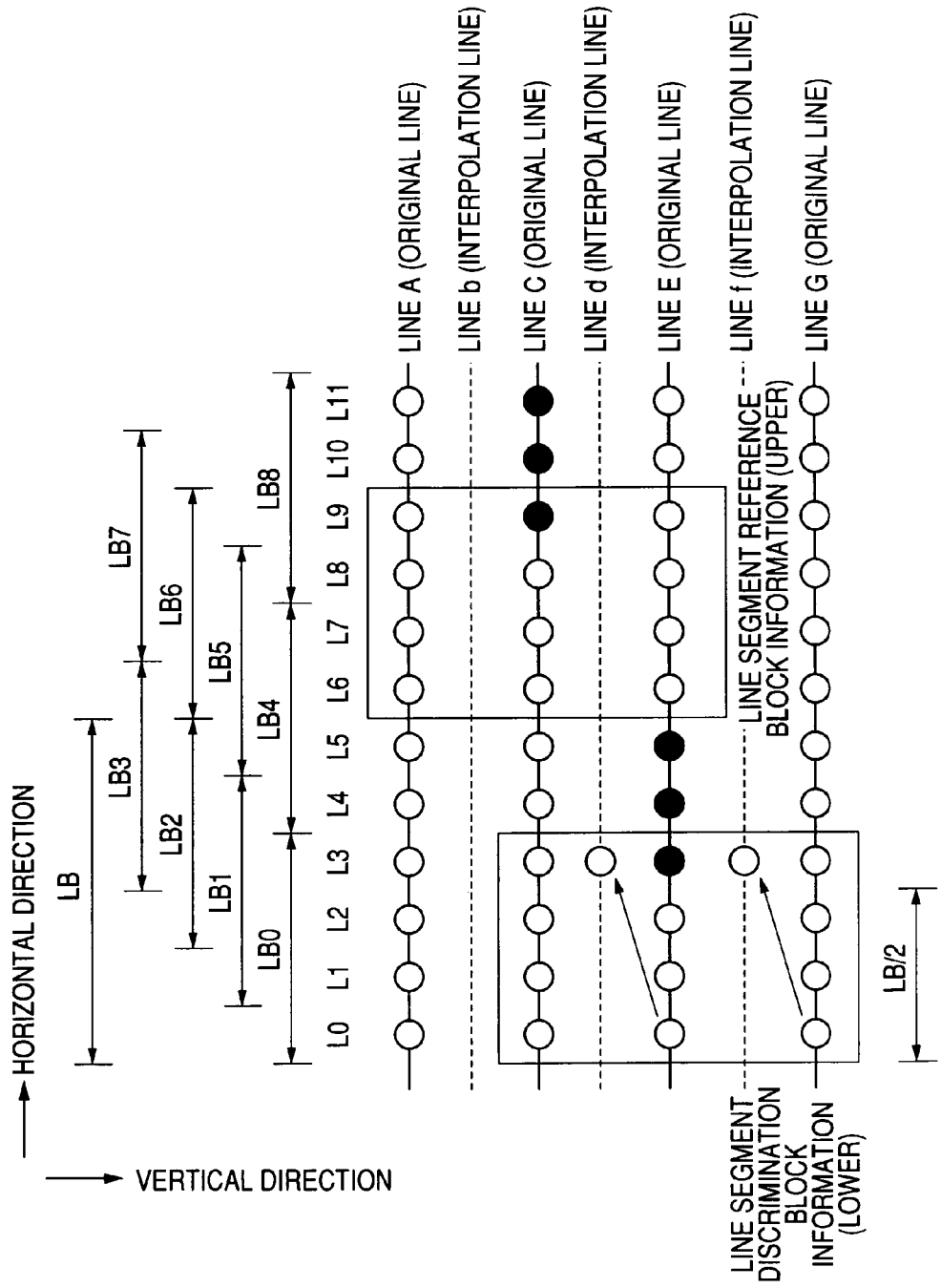
FIG. 23 is a schematic view showing a mode of oblique correction between segment discrimination block information (lower) and segment reference block information (upper) in the second embodiment of the present invention.

In the above-described configuration, in case image information having a slope in an oblique direction as shown in FIG. 9 or 10 is inputted, there is executed a process similar to that in the first embodiment. FIGS. 22 and 23 show a mode of correction of interpolation information in the present embodiment, in case image information of an oblique line of a line width corresponding to a pixel is inputted.

FIG. 22 shows a case where blocks with matching pixel information are detected in the segment discrimination block information (upper) outputted from the discrimination block generator 111802 and the plural segment reference block information (lower) outputted from the reference block generator 111801.

In the case shown in FIG. 22, segment reference block information (lower) having same pixel information as in the segment discrimination block information (upper) is detected in the segment reference block information positioned in LB6. In such case, the segment priority encoder (1) 111819 outputs a value "6", as position information. On the other hand, as the segment block matching detector (2) 111818 does not detect matching blocks, the segment priority encoder (2) 111820 outputs a value "F" as the position information. Then the large/small discriminator (2) 111821 compares the output values of the segment priority encoder (1) 111819 and the segment priority encoder (2) 111820 and selects and outputs a smaller value "6" and also outputs segment block matching detection information (upper) "1". As the discrimination block generator 111802 outputs segment detection information "1", the selector (2) 111813 selects an output value "6" from the large-small discriminator (2) 111821 for supply to the position information counter 111810, and the AND element 111815 outputs a segment correction enable signal "1". As the large-small discriminator (2) 111821 outputs the segment block matching detection information (upper) "1", the position information counter 111810 loads a counter value "6" outputted from the selector (2) 111813. Also the correction condition detector 1118 outputs a value "3", which is a half of the output value "6" from the selector (2) 111813, as the correction position information to the interpolation information memory 1116. The correction condition detector 1118 constitutes pixel position specifying means of the present invention.

Since the segment block matching detection information (upper) is "1", the selector (1) 111808 outputs, as the correction data, pixel information positioned on the lines C and E at L0, among the pixel information of the segment discrimination block information (upper).

Also in this configuration, as in the first embodiment, correction data for 2 pixels are generated for single discrimination block information and are simultaneously processed, whereby it is rendered possible to simultaneously correct the results of interpolation, generated by the prior IP conversion process, in the upper and lower interpolation lines of the image information inputted as an oblique line of a line width corresponding to a pixel as shown in FIG. 13.

In the interpolation information memory 1116, based on the correction position information outputted from the correction condition detector 1118, it is discriminated that the interpolation information at a position L3 is to be corrected, and, based on the segment block matching detection information (upper) "1", it is discriminated that the interpolation information positioned on lines d and f are to be corrected, and in case the interpolation pixels on the lines d and f at L3 are moving images, the interpolation information on such positions are rewritten with the correction data outputted from the correction condition detector 1118.

Thus the correction process utilizing the pixel information at LB0 as the segment discrimination block information (upper) is completed, and then a similar process is repeated utilizing the pixel information at LB1 as the segment discrimination block information (upper), but, since the position information counter 111810 memorizes the position information "6", results of matching detection with the segment reference block information (lower) from LB2 to LB6 are disregarded and the matching detection is executed with the segment reference block information (lower) at LB7 and thereafter. Thus, when the discrimination block information is renewed to a next block, it is rendered possible to avoid that same segment reference block information (lower) as that processed in the previous discrimination block information is repeatedly selected and processed. (In practice, since the pixel information is shifted by the reference block generator 111801 and the reference block generator 111802, the segment discrimination block information (upper) at LB1 is processed as LB0, and the segment reference block information (lower) from LB2 to LB6 are processed as LB1 to LB5.)

Also, in the present embodiment, the correction data are generated from the segment discrimination block information (upper), but, as already explained in the first embodiment, the correction data may also be generated from the segment discrimination block information (upper) and the segment reference block information (lower) selected by the segment priority encoder (1) 111819. More specifically, it is also possible to adopt an average value of the pixel information at L0 on the line C and the pixel information at L6 on the line E as the correction data for the interpolation pixel at L3 on the line d, and to adopt an average value of the pixel information at L0 on the line E and the pixel information at L6 on the line G as the correction data for the interpolation pixel at L3 on the line f.

FIG. 23 shows a case where blocks with matching pixel information are detected in the segment discrimination block information (lower) outputted from the discrimination block generator 111802 and the plural segment reference block information (upper) outputted from the reference block generator 111801.

In the case shown in FIG. 23, segment reference block information (upper) having same pixel information as in the segment discrimination block information (lower) is detected in the segment reference block information positioned at L6. In this case, the segment priority encoder (2) 111820 outputs a value "6" as position information. On the other hand, as the block matching detector (1) 111817 does not detect matching blocks, the segment priority encoder (1) 111819 outputs a value "F" as the position information. Then the large/small discriminator (2) 111821 compares the output values of the segment priority encoder (1) 111819 and the segment priority encoder (2) 111820 and selects and outputs a smaller value "6" and also outputs segment block matching detection information (lower) "1". As the discrimination block generator 111802 outputs segment detection information "1", the selector (2) 111813 selects an output value "6" from the large-small discriminator (2) 111821 for supply to the position information counter 111810, and the AND element 111815 outputs a segment correction enable signal "1". As the large-small discriminator (2) 111821 outputs the segment block matching detection information (lower) "1", the position information counter 111810 loads a counter value "6" outputted from the selector (2) 111813. Also the correction condition detector 1118 outputs a value "3", which is a half of the output value "6" from the selector (2) 111813, as the correction position information to the interpolation information memory 1116.

Since the segment block matching detection information (lower) is "1", the selector (1) 111808 outputs, as the correction data, pixel information positioned on the lines E and G, among the pixel information of the segment discrimination block information (lower).

In the interpolation information memory 1116, based on the correction position information outputted from the correction condition detector 1118, it is discriminated that the interpolation information at a position L3 is to be corrected, and, based on the segment block matching detection information (lower) "1", it is discriminated that the interpolation information positioned on lines d and f are to be corrected, and in case the interpolation pixels on the lines d and f at L3 are moving images, the interpolation information on such positions are rewritten with the correction data outputted from the correction condition detector 1118.

In the correction process for the interpolation information in the present embodiment shown in FIGS. 22 and 23, in case blocks with matching pixel information are detected in the segment discrimination block information outputted from the discrimination block generator 111802 and the plural segment reference block information outputted from the reference block generator 111801, a correction is executed on the interpolation information positioned between the segment discrimination block information and the segment reference block information for which the matching is detected. In the present embodiment, however, the segment discrimination block information and the segment reference block information are constituted as blocks having plural pixel information in the horizontal direction, and the correction process on the interpolation information may also be executed simultaneously on plural interpolation information in the horizontal direction as in the segment discrimination block information and the segment reference block information.

Figure 24:
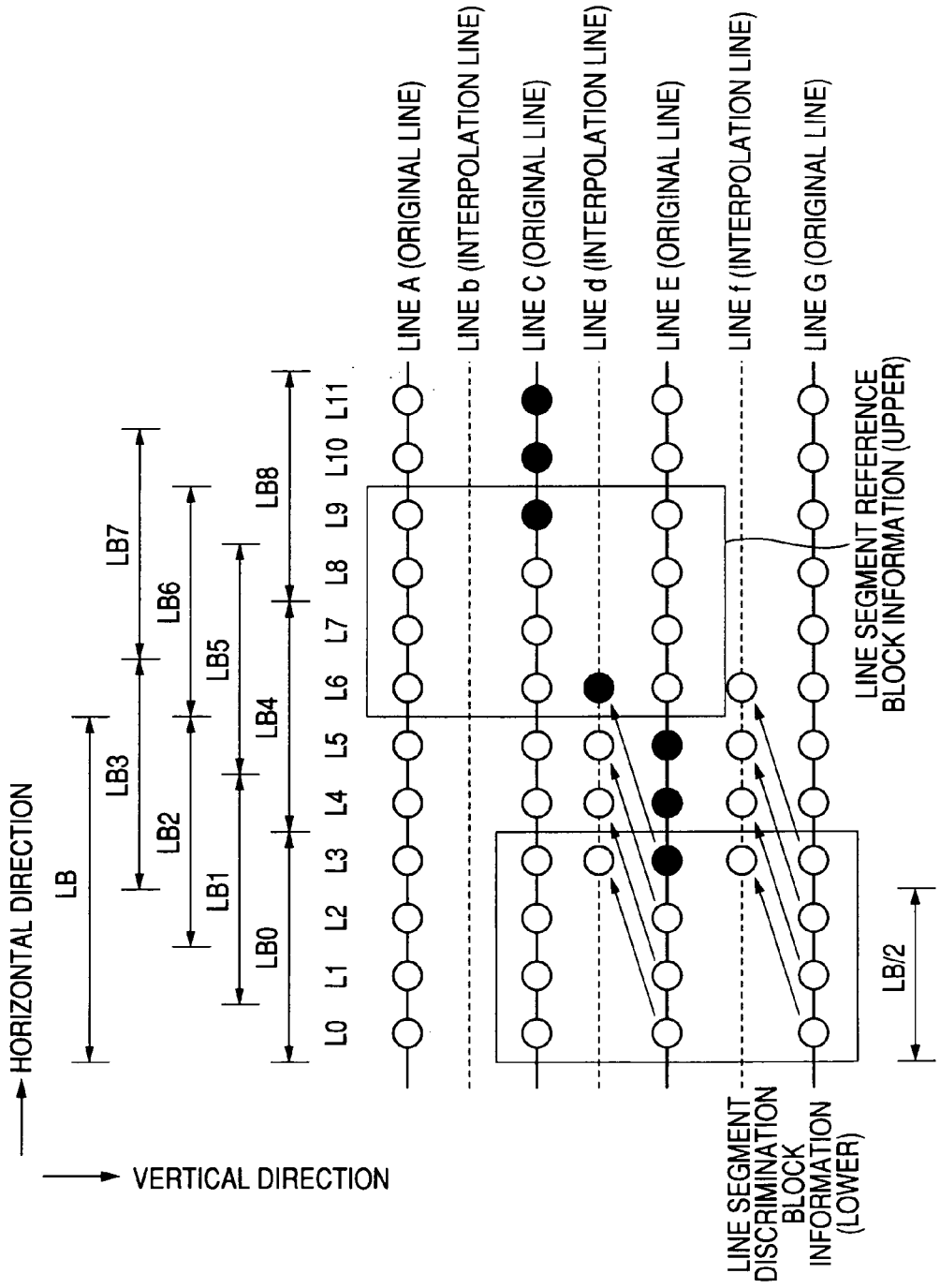
FIG. 24 is a schematic view showing a mode of oblique correction to plural interpolation information in the horizontal direction by a matching correction between segment discrimination block information (lower) and segment reference block information (upper) in the second embodiment of the present invention.

FIG. 24 shows a case where blocks with matching pixel information are detected in the segment discrimination block information (lower) outputted from the discrimination block generator 111802 and the plural segment reference block information (upper) outputted from the reference block generator 111801 as in FIG. 23 and the correction process is executed simultaneously on the plural interpolation information in the horizontal direction.

In the case shown in FIG. 24, since the segment reference block information (upper) having same pixel information as the segment discrimination block detection information (lower) is detected in the segment reference block information at L6, the selector (1) 111808 outputs, as the correction data, pixel information of 4 pixels in the horizontal direction positioned on the lines E and G, among the pixel information of the segment discrimination block information (lower). In the interpolation information memory 1116, based on the correction position information outputted from the correction condition detector 1118, it is discriminated that the interpolation information of 4 pixels in the horizontal direction starting from a position L3 is to be corrected, and in case the interpolation pixels on the lines d and f at L3 to L6 are moving images, the interpolation information on such positions are rewritten with the correction data outputted from the correction condition detector 1118.

By executing such simultaneous correction process on the plural interpolation information in the horizontal direction in single segment discrimination block information, it is rendered possible, even in case the image information inputted by the interlaced scanning method includes a pixel not having a normal pixel value for example by the influence of a noise, to avoid the influence of such pixel. For example, in case of executing a correction process simultaneously on the interpolation information of 4 pixels in the horizontal direction, each interpolation information is subjected to four correction processes, and, even in case a pixel not having a normal pixel value for example by the influence of a noise is present in the segment discrimination block information to hinder the detection of the matching with the segment reference block information in one of such processes, the correction process can be executed if the matching of the pixel information can be detected between the segment discrimination block information and the segment reference block information in the remaining three processes.

(Generation Process of Interpolation Information)

Figure 25:
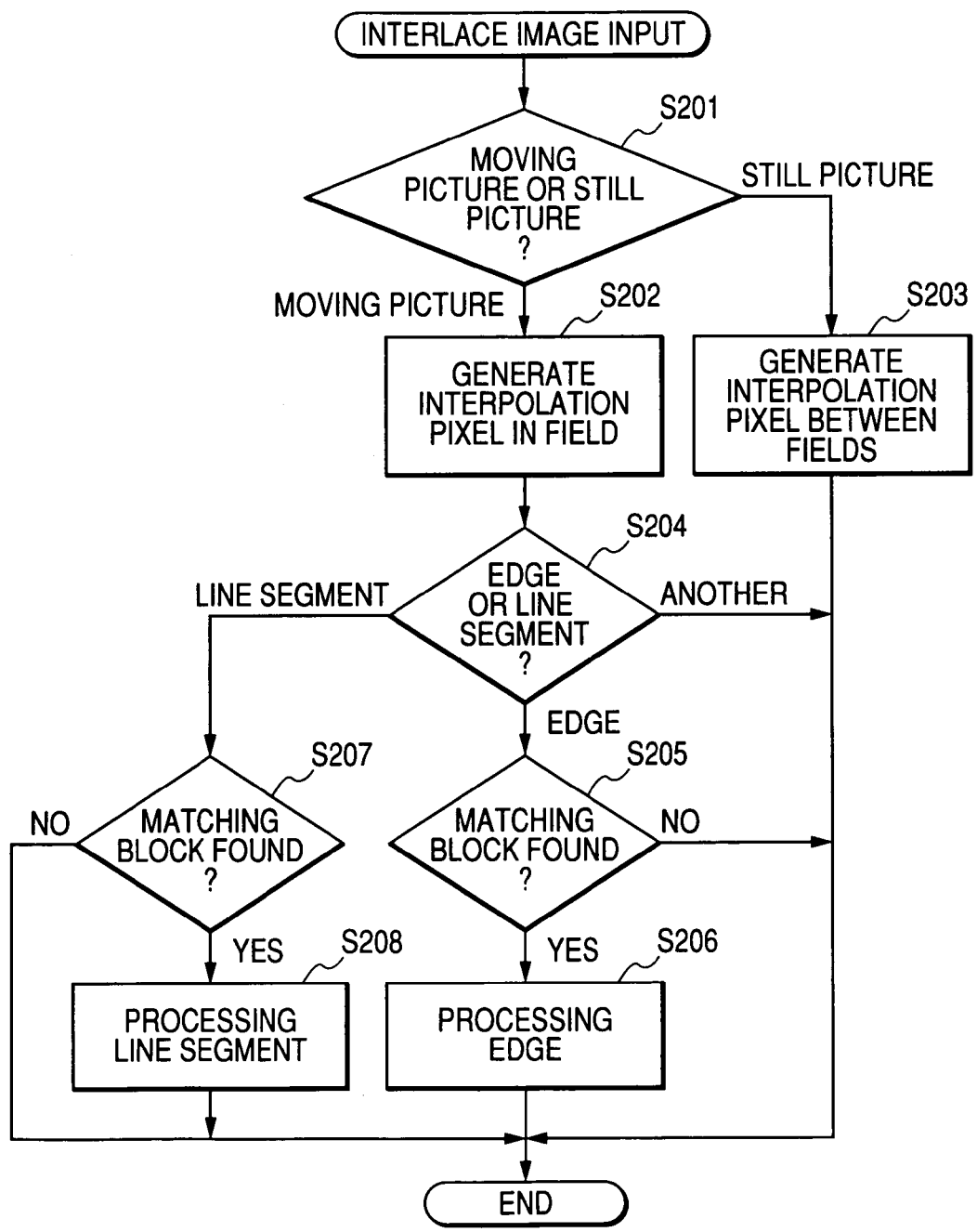
FIG. 25 is a flow chart showing a flow of an oblique correction process in the second embodiment of the present invention.

A process flow for generating the interpolation information by the IP conversion process circuit embodying the present invention as shown in FIG. 14 is shown in FIG. 25.

At first, as in the prior IP conversion process circuit, the movement information generator 103 determines movement information at the interpolation pixel from the interfield difference information (S201), and, the interpolation information is generated from the pixel information within the field in case of a moving image (S202), or the interpolation information is generated from the pixel information in the preceding field in case of a still image (S203). Then, in case the movement information at the interpolation pixel is a moving image, there is executed a correction process in the oblique correction processing unit 111. At first, among the pixel information of 4 lines inputted into the discrimination block generator 111802, there is discriminated whether an edge portion is present between the pixels of the 2nd line and the 3rd line at L0 or a segment portion in the block from L0 to L3 (S204) In case presence of an edge portion is detected in the step S204, there is discriminated whether matching blocks are detected in the block matching detector (1) 111803 and the block matching detector (2) 111804 (S205). In case matching blocks are detected in S205, a pixel position for correction process and correction data are generated, and an oblique correction process is executed on the interpolation information determined in S202 (S206). In case a segment is detected in the step S204, there is discriminated whether matching blocks are detected in the segment block matching detector (1) 111817 and the segment block matching detector (2) 111818 (S207). In case matching blocks are detected in S207, a pixel position for correction process and correction data are generated, and an oblique correction process is executed on the interpolation information determined in S202 (S208). The process is terminated in case matching blocks are not detected in S205 or S207.

Figure 26:
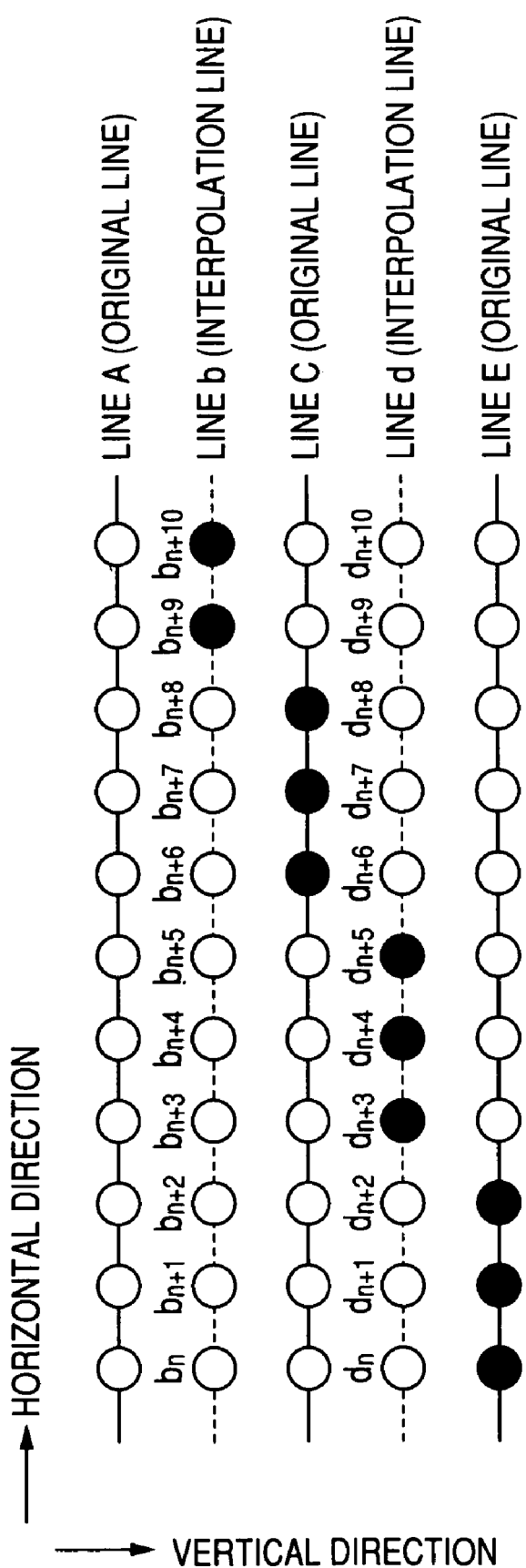
FIG. 26 is a schematic view showing a mode of an oblique correction process executed on a segment image in the second embodiment of the present invention.

FIG. 26 shows a mode of an interpolation process on image information of an oblique line having a line width corresponding to a pixel as shown in FIG. 32, by the IP conversion process circuit embodying the present invention as shown in FIG. 14.

In the interpolation process by the first embodiment shown in FIG. 13, the result of interpolation generated by the prior IP conversion process remains in the interpolation pixels at $d_n$, $d_{n+1}$, $d_{n+2}$, $d_{n+6}$, $d_{n+7}$, $d_{n+8}$, $b_{n+6}$, $b_{n+7}$ and $b_{n+8}$, but the embodiment of the present invention, as will be apparent from FIG. 26, allows to display image information of an oblique line having a line width corresponding to a pixel as in the original image information shown in FIG. 32.

The correction process explained in the present embodiment is applied, like the first embodiment, to information once converted into image information by progressive scanning, thus being effective to image information or print information processed in a computer.

Also in the foregoing embodiments, the matching/unmatching of the pixel information in the unit of a block is discriminated by judging matching/unmatching of the pixel information of each pixel in the block. However the present invention is not limited to a case of image formation with a binary gradation of 0 (full-off) and 1 (full-on), but can be advantageously employed in a configuration of executing image formation by 3 levels or more, preferably 256 levels or more. In such case, for pixel information that can assume a suitable threshold value (for example from 0 to 255), a process similar to the foregoing embodiments is possible by selecting an intermediate level 127 as the threshold value, and replacing pixel information equal to or less than such threshold value with 0 and pixel information larger than such threshold value with 1. This method is not a strict matching/unmatching discrimination, but allows a discrimination of similarity including the matching/unmatching discrimination. After such matching/unmatching discrimination (similarity discrimination) by such replacement, appropriate pixel information can be obtained in the interpolation pixel by employing the input pixel information. Also the discrimination of similarity between the blocks can be achieved by other methods than that explained before, as long as a similarity between the oblique edges can be detected. For example the similarity between the blocks can be discriminated by a similarity in the difference of the pixel information within the block.

The pixel interpolation apparatus and the pixel interpolating method of the present invention are applicable to image information inputted by an interlaced scanning into image information by a progressive scanning, and an interpolation of pixel information to be employed in a display or a printing of a computer system.

This application claims priority from Japanese Patent Application No. 2004-075204 filed Mar. 16, 2004, and Japanese Patent Application No. 2005-065479 filed Mar. 9, 2005 which are hereby incorporated by reference herein.

What is claimed is:

1. A pixel interpolation apparatus comprising:
a discrimination circuit for discriminating, based on an input image signal, a similarity between (a) a discrimination block including two pixels constituting an edge portion and (b) a plurality of reference blocks, both the discrimination block and the plurality of reference blocks being constituted of plural pixels on original lines and interpolation pixel positions on interpolation lines, wherein the plurality of reference blocks are, collectively, positioned neighboring to the discrimination block and shifted upwards or downwards to a position by at least a line with respect to the discrimination block; and
a circuit for outputting pixel information of a plurality of interpolation pixels in a reference block positioned between the discrimination block and another reference block having a similarity to the discrimination block, wherein the pixel information of the plurality of interpolation pixels are determined so as to provide the interpolation pixels, on the interpolation lines corresponding to pixel positions on the original lines in the discrimination block and the reference block having the similarity, with pixel information based on pixel information of pixels on the pixel positions.

2. A pixel interpolation apparatus according to claim 1, wherein said outputting circuit outputs:
pixel information of the two interpolation pixels respectively utilizing pixel information of two pixels constituting the edge portion in the discrimination block; or
pixel information of two interpolation pixels respectively utilizing pixel information of two pixels corresponding to the two pixels constituting the edge portion in the reference block.

3. A pixel interpolation apparatus according to claim 1, wherein the interpolation pixel of the plurality of interpolation pixels is a pixel positioned at a center position or a position neighboring thereto between the mutually corresponding pixels in the discrimination block and the reference block having a similarity.

4. A pixel interpolation apparatus according to claim 1, further comprising a movement information generating circuit for generating movement information for discriminating a movement of an image, wherein, in case the movement information indicates a movement larger than a predetermined movement, said outputting circuit outputs the pixel information.

5. A pixel interpolation apparatus according to claim 1, wherein, in case a certain reference block is discriminated as a reference block of similarity to the discrimination block and pixel information of an interpolation pixel between the reference block and the discrimination block is outputted, the reference block is inhibited from being used as a reference block to a discrimination block positioned neighboring to the discrimination block.

6. A pixel interpolation apparatus according to claim 1, wherein a structure of the discrimination block and the reference block is made different in a case of detection of an edge portion by a segment of a line width of a pixel and in a case of detection of an edge portion by a segment of a line width of two or more pixels.

7. A pixel interpolating method comprising:
a step of discriminating, based on an input image signal, a similarity between (a) a discrimination block including two pixels constituting an edge portion and (b) a plurality of reference blocks, both of the discrimination block and the plurality of reference blocks being constituted of plural pixels on original lines and interpolation pixel positions on interpolation lines, wherein the reference blocks, are collectively, positioned neighboring to the discrimination block and shifted upwards or downwards to a position by at least a line with respect to the discrimination block; and
a step of outputting pixel information of a plurality of interpolation pixels in a reference block positioned between the discrimination block and another reference block having a similarity, to the discrimination block, wherein the pixel information of the plurality of interpolation pixels are determined so as to provide the interpolation pixels, on the interpolation lines corresponding to pixel positions on the original lines in the discrimination block and the reference block having the similarity, with pixel information based on pixel information of pixels on the pixel positions.

8. A pixel interpolating method according to claim 7, wherein said outputting step outputs:

pixel information of the two interpolation pixels respectively equal to pixel information of two pixels constituting the edge portion in the discrimination block; or pixel information of two interpolation pixels respectively equal to pixel information of two pixels corresponding to the two pixels constituting the edge portion in the reference block.

9. A pixel interpolating method according to claim 7, wherein the interpolation pixel of the plurality of interpolation pixels is a pixel positioned at a center position or a position neighboring thereto between the mutually corresponding pixels in the discrimination block and the reference block having a similarity.

10. A pixel interpolating method according to claim 7, wherein, in case movement information indicates a movement larger than a predetermined movement, said outputting step outputs the pixel information.

11. A pixel interpolating method according to claim 7, wherein, in case a certain reference block is discriminated as a reference block of similarity to the discrimination block and pixel information of an interpolation pixel between the reference block and the discrimination block is outputted, the reference block is inhibited from being used as a reference block to a discrimination block positioned neighboring to the discrimination block.

12. A pixel interpolating method according to claim 7, wherein a structure of the discrimination block and the reference block is made different in a case of detection of an edge portion by a segment of a line width of a pixel and in a case of detection of an edge portion by a segment of a line width of two or more pixels.

* * * * *